Inventors:

Floyd L. Cassidy
Daniel Y. C. Ko

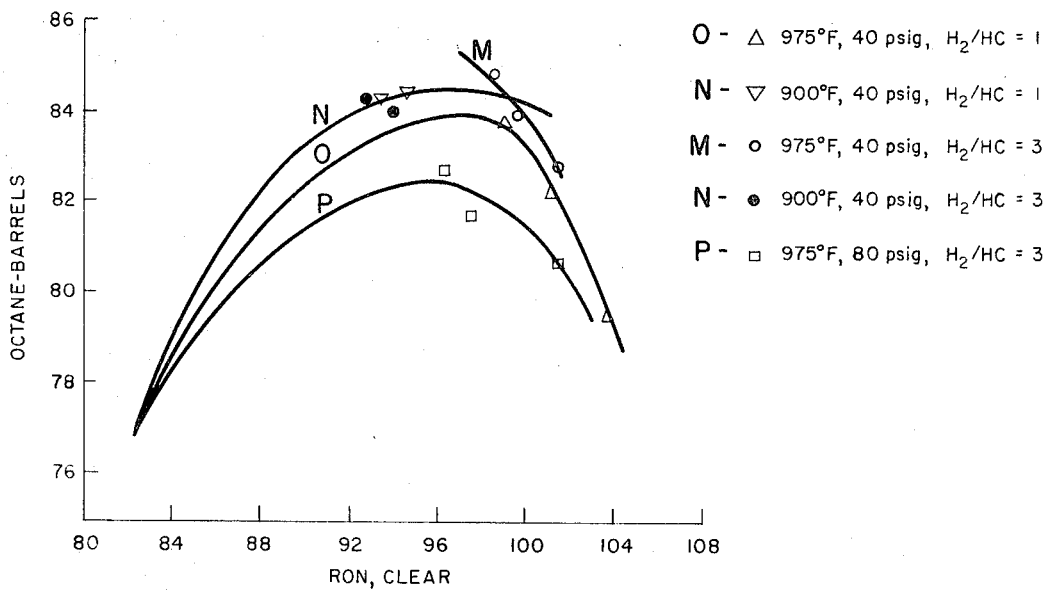
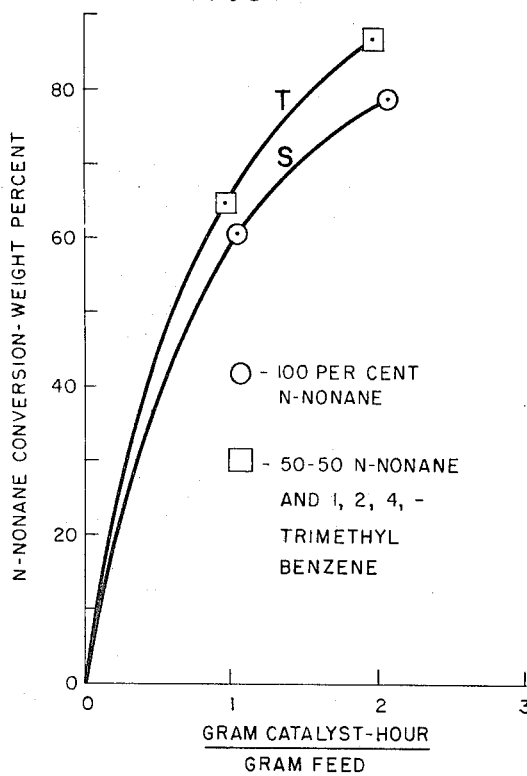
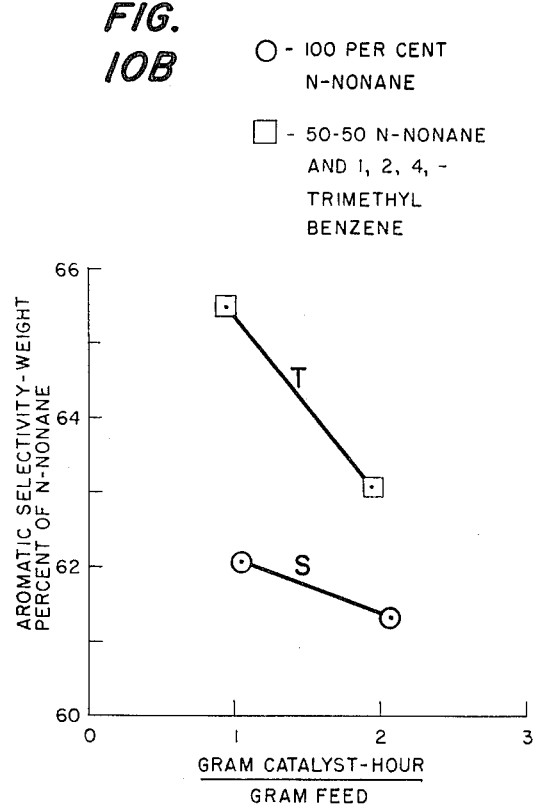

United States Patent Office 3,776,836
Patented Dec. 4, 1973

3,776,836
REFORMING PROCESS IN TWO STAGES AT
DIFFERENT PRESSURES
Daniel Y. C. Ko, Pittsburgh, and Donald L. Stahlfeld, Glenshaw, Pa., assignors to Gulf Research & Development Company, Pittsburgh, Pa.
Filed Aug. 23, 1971, Ser. No. 174,005
Int. Cl. C10g 39/00
U.S. Cl. 208—65
17 Claims

ABSTRACT OF THE DISCLOSURE

A $C_5^+$ naphtha containing $C_6$ through $C_{10}$ and even $C_{11}$ and $C_{12}$ naphthenes and linear (non-ring structure) paraffins is reformed to improve its octane value by passage through one or a plurality of relatively high pressure acidic platinum catalyst naphthene aromatization reactors in series with one or more relatively lower pressure paraffin dehydrocyclization catalyst reactors. Most $C_9$ and $C_{10}$ linear paraffins have an extremely low octane value (the octane number of normal decane is −53) and must generally be cracked to higher octane number fragments or to gases to achieve a gasoline product of satisfactory octane number. In the prior art this cracking generally occurred in the acidic platinum catalyst phase wherein the hydrogen pressure is high, protecting the catalyst from excessive coking. Cracking of the $C_9$ and $C_{10}$ paraffins in the dehydrocyclization phase wherein the total pressure is lower in order to favor dehydrocyclization in addition to dehydrogenation would result in severe coking of catalyst. According to this invention $C_9$ and $C_{10}$ linear paraffins are not hydrocracked but rather are dehydrocyclized. It has now been discovered that the dehydrocyclization phase must dehydrocyclize $C_9$ and $C_{10}$ paraffins to $C_9$ and $C_{10}$ aromatics if there is to be an increase in octane-barrel value in the dehydrocyclization phase. According to the present process, the $C_9$ and $C_{10}$ paraffins are not cracked in the high pressure phase but are charged to the low pressure dehydrocyclization catalyst phase wherein the pressure is sufficiently low to dehydroaromatize the $C_9$ and $C_{10}$ paraffins so that there is a net increase in $C_9$ and $C_{10}$ aromatics in the dehydrocyclization phase. The pressure in the dehydrocyclization phase is sufficiently low that there is relatively little or no net increase in $C_6$ and $C_7$ aromatics at least in the zone of the dehydrocyclization phase wherein dehydroaromatization of $C_9$ and $C_{10}$ paraffins occurs. It has now been discovered that a significant net increase of $C_9$ and $C_{10}$ aromatics is incompatible with a significant net increase in $C_6$ and $C_7$ aromatics in the same dehydrocyclization zone, and vice versa. It has further been discovered that dehydrocyclization of $C_9$ and $C_{10}$ linear paraffins is enhanced by the presence in the feed of $C_9$ and $C_{10}$ aromatics containing multi-methyl or ethyl groups on the benzene ring together with a high ratio of hydrogen to hydrocarbon, even though both aromatics and hydrogen are products of the reaction. Therefore, a variation in the process accomplishes dehydrocyclization of $C_6$ and $C_7$ linear paraffins in an upstream zone of the dehydrocyclization phase and utilizes the hydrogen and aromatics therein produced with or without hydrogen and aromatics produced in the high pressure naphthene aromatization phase to enhance dehydroaromatization of $C_9$ and $C_{10}$ paraffins which are separately added to a downstream zone in the dehydrocyclization phase.

Figure 1:
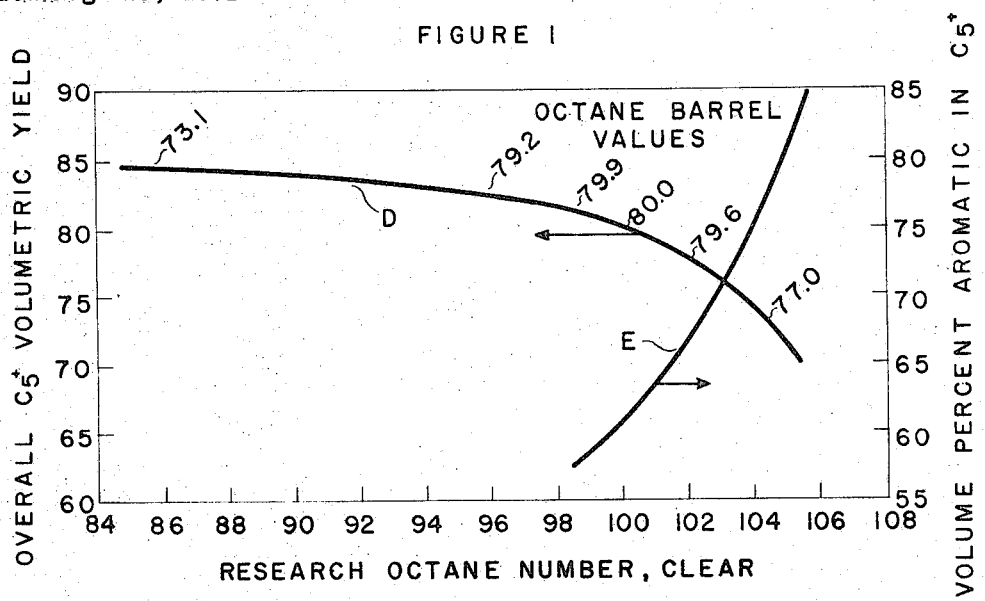

This invention relates to reforming of gasoline such as straight run naphtha in a process utilizing in series a first phase employing a relatively high pressure and an acidic platinum-group catalyst and a second phase employing a relatively lower pressure and a dehydrocyclization catalyst to produce a gasoline product with a high octane-barrel value. The platinum-group catalyst can be platinum and the dehydrocyclization catalyst can comprise platinum, chromia or molybdena. The first phase usually comprises a plurality of reactors and the second phase comprises one or more reactors.

In the reforming of naphthas to produce gasoline, a variety of dehydrogenation and other reactions occur, each of which tends to improve the octane rating of the gasoline product. In a reforming process utilizing an acidic platinum-group metal catalyst dehydroisomerization reactions occur, the one which occurs most readily being the dehydroisomerization of naphthenes to aromatics. Aromatics constitute the most desirable product of reforming in terms of octane improvement. In the high pressure acidic platinum catalyst phase, isomerization of normal paraffins to isoparaffins can also occur to achieve an equilibrium ratio of iso to normal paraffins in the platinum phase reactors, with iso-normal ratios increasing with decreasing temperatures. Isoparaffins have a higher octane value than corresponding normal paraffins. Other reactions that can occur in the high pressure platinum catalyst phase include dehydroaromatization of paraffins and hydrocracking. The dehydroaromatization of paraffins in the platinum phase occurs by first forming a naphthene intermediate which is readily crackable. It is the most difficult reaction to accomplish and is generally accompanied by temperature conditions of sufficient severity to concomitantly induce appreciable hydrocracking. Under hydrocracking conditions high boiling paraffins tend to hydrocrack more readily than low-boiling paraffins while isoparaffins hydrocrack more readily than normal paraffins. Since the high pressure platinum phase is not highly selective towards dehydroaromatization of paraffins and since most of the high molecular weight paraffins have an exceptionally low octane number (the octane number of normal decane is −53), the prior art has found it desirable to hydrocrack non-aromatized $C_9$ and $C_{10}$ paraffins to lower molecular weight fragments of higher octane number, or to gases.

In the dehydrocyclization phase, isomerization is not favored and the most important reaction which occurs is the dehydrocyclization of paraffins to aromatics. In the dehydrocyclization phase, the dehydrocyclization of paraffins to aromatics proceeds most advantageously at relatively low pressures, the lowest operable pressures favoring dehydrocyclization of $C_9^+$ paraffins over $C_6$ and $C_7$ paraffins. When employing a chromia catalyst in the dehydrocyclization phase dehydrogenation of saturated paraffins to olefins also occurs and this reaction is a stage in the ultimate conversion to aromatics. An equilibrium ratio of olefins to paraffins exists in the dehydrocyclization phase. Olefins have a higher octane value than corresponding paraffins. When employing a platinum dehydrocyclization catalyst the cyclization of linear paraffins tends to occur prior to dehydrogenation.

The present process comprises a first and a second reaction phase in sequence. The two phases are maintained separate, distinct and unintermingled. Substantially all naphthene aromatization occurring in the process occurs in the first phase in the substantial absence of paraffin aromatization. Substantially all paraffin aromatization occurring in the process occurs in the second phase in the substantial absence of naphthene aromatization. The first and second phases differ fundamentally from each other in respect to relative pressure in order to accomplish the specialized functions of each phase. The pressure in the first phase is 225 to 700 p.s.i. and the pressure in the second phase depends on the dehydrocyclization catalyst, but is always below 200 p.s.i. The relatively high pressure in the first phase permits naphthene aromatization to proceed but prevents dehydrocyclization of paraffins. Data are presented below which show that the lowest pressures in the dehydrocyclization pressure range favor $C_9+$ aromatization over $C_6$ and $C_7$ aromatization.

It is desired, but not essential, that the inlet temperature to each second phase reactor be higher than the inlet temperature to each first phase reactor since the paraffin aromatization reaction is more difficult to effect than the naphthene aromatization reaction. However, the relative temperature level will be determined in part by the acidity of the particular catalysts employed in the two phases and the pressures employed. In general, greater hydrogen recycle is required to the second phase than to the first phase. Advantageously, it is more economic to repressurize recycle hydrogen for the lower pressure second phase than for the higher pressure level of the first phase. In the second phase, as hydrogen partial pressure increases from a very low level, dehydrocyclization activity increases to a peak and then decreases. Increase and decrease of dehydrocyclization activity with variation of hydrogen partial pressure in the second phase is advantageously accompanied by a coincident opposite effect upon cracking activity so that peak dehydrocyclization activity is accompanied by a minimum in hydrocracking activity.

In conventional processes the high pressure platinum catalyst phase reaction generally occurs in a plurality of reactor in series, three reactors in series being usual. The feed to the high pressure platinum catalyst phase can be a straight run or cracked naphtha boiling in the gasoline range, that is, from about 150 to 175 to 400 or 450° F., and can contain about 5 to 20 percent aromatics, about 20 to 70 percent paraffins, with the remainder being naphthenes. Feeds having a boiling range up to 450° F. will contain $C_{11}$ and $C_{12}$ paraffins to which the invention will also apply, in the same manner as to $C_9$ and $C_{10}$ paraffins. This distribution of feed materials is illustrative and non-limiting. Since the naphthenes are dehydroisomerized readily to aromatics in the high pressure platinum catalyst phase while the dehydroaromatization of paraffins to aromatics in the platinum catalyst phase is a much more difficult reaction and does not readily occur, the quality of a naphtha feed to a high pressure platinum catalyst reformer varies inversely with the amount of paraffins it contains.

The straight run naphtha which is charged to the first of the series of high pressure acidic platinum catalyst reactors is heated to about 900 to 950° F. at a pressure of about 225 to 700 p.s.i. and passed through the first platinum catalyst reactor. The dehydrogenation reactions occurring are endothermic so that there is substantial temperature drop in the first reactor. The temperature drop in the first reactor can be about 120° F., resulting in an average temperature in the first reactor of about 870° F. In the first reactor the primary reaction is the conversion of naphthenes to aromatics. The effluent of the first reactor is at a temperature below 800° which is too low for the reaction to proceed further and therefore the effluent from the first reactor is passed through a furnace for reheating to a temperature of 900 to 950° F. before entering the second platinum catalyst reactor. The pressure in the second reactor is essentially the same as the first reactor. However, the temperature drop in the second reactor is only about 60° F. so that the average temperature in the second reactor is about 890° F., which is higher than the average temperature of the first reactor. The reason for the higher average temperature in the second reactor is that most of the naphthenes are converted in the first reactor and before the terminus of the second reactor substantially all of the naphthenes are converted and equilibrium isomerization of paraffins is reached so that no additional reactions occur to further reduce the temperature.

In order to achieve dehydroaromerization of linear paraffins and to accomplish hydrocracking of higher molecular weight low octane value linear paraffins in the high pressure phase it is necessary to pass the effluent from the second reactor through a furnace to be reheated to an inlet temperature of 900 to 950° F. for entry to a third reactor at a pressure of about 225 to 700 p.s.i. The temperature effects in the third reactor are fundamenally different from the first two reactors because the easier dehydrogenation reactions which occur in the high pressure acidic platinum catalyst phase have been substantially completed in the first two reactors permitting significant hydrocracking to occur in the third reacor, which is an exothermic reaction. In the third reactor the limited amount of dehydrogenation and dehydrocyclization reactions which occur are not sufficient a counterbalance in the face of the hydrocracking to accomplish a significant temperature drop in the third reactor. Therefore, in the third reactor there will be little or no temperature drop and slight temperature rise may even occur so that the average temperature in the third reactor is the highest, i.e., about 920° F.

As stated, in the third (hydrocracking) reactor of the high pressure platinum catalyst phase the temperature is generally either constant or it increases slightly. However, a constant temperature in a high pressure platinum catalyst phase reactor does not indicate that the number of moles hydrocracked via exothermic hydrogen consuming reactions is balanced against the number of moles of aromatic produced via endothermic hydrogen producing reactions. There is an imbalance in the number of moles of hydrogen produced and consumed in a single molecule in the two types of reactions so that in a constant temperature reactor more moles of hydrocarbon are hydrocracked than are aromatized. A high pressure platinum phase reactor in which a constant temperature or a temperature rise prevails is not advantageous for purposes of the present invention.

While the reactions in the first two high pressure acidic platinum catalyst phase reactors accomplish octane improvement by converting lower octane value molecules to higher octane value molecules, such as by converting naphthenes to aromatics and paraffins to isoparaffins, the octane improvement at the third reactor is achieved primarily by destroying via hydrocracking gasoline range very low octane value linear paraffins. Throughout this application the term linear paraffins means normal and isoparaffins and excludes ring structures. Although much of the low octane value hydrocarbons is cracked to gases, controlled hydrocracking in the third reactor can result in a significant degree of replacement of low octane value molecules by higher octane value molecules if hydrocracking is directed towards $C_9$ and $C_{10}$ paraffins, which are generally the highest or among the highest boiling and most easily crackable paraffins in the feed, as long as at least a fragment of the $C_9$ or $C_{10}$ molecule remains in the gasoline boiling range ($C_5+$). Most of the $C_9$ and $C_{10}$ linear paraffins are of extremely low octane value while $C_5$ and $C_6$ linear paraffins have a considerably higher octane value. The octane value of normal hexene is 24.8, normal heptane has an octane value of 0, normal octane has an octane value of —17 and normal decane has an octane value of —53. It is seen that the high molecular weight linear paraffins, particularly non-branched linear paraffins, exhibit such exceptionally low octane values that it is important to successful octane value upgrading in a conventional high pressure reforming process that these molecules be hydrocracked.

It has been the practice of the prior art to hydrocrack the $C_9$ and $C_{10}$ paraffins in the high pressure acidic platinum catalyst phase even when the effluent of the high pressure platinum catalyst phase is charged to a subsequent low pressure dehydrocyclization phase. The reason is that the dehydrocyclization phase operates at extremely low pressures to favor paraffin dehydroaromatization, sometimes below 25 or 52 p.s.i., at which pressures the hydrogen partial pressure is so low that any hydrocracking which occurs tends to lead to severe coking of catalyst. Since the $C_9$ and $C_{10}$ paraffins are the highest molecular weight paraffins in the hydrocarbon stream these are the most readily crackable hydrocarbons and since cracking can occur with much less coke deposition in the high pressure phase than in the low pressure phase it has been considered advantageous to hydrocrack the $C_9$ and $C_{10}$ paraffins in advance of the low pressure dehydrocyclization reactor. This is especially true because in order to achieve conditions sufficiently severe for extensive dehydrocyclization of $C_6$ and $C_7$ paraffins in the low pressure phase hydrocracking of the easily crackable $C_9$ and $C_{10}$ paraffins necessarily occurs, making it important to successful operation of the dehydrocyclization phase to pre-remove these heavy paraffins in the high pressure platinum catalyst phase.

The aforementioned mode of operation of a combination high pressure platinum catalyst phase and dehydrocyclization phase reforming process is appreciably altered in accordance with the present invention. The present invention is particularly important in view of impending requirements for production of lead-free or low lead gasoline and is directed toward a coordinated high pressure platinum phase-low pressure dehydrocyclization phase reforming operation in which the gasoline product will not be upgraded by the addition of lead so that the reformate gasoline product must be produced with a high unleaded octane value. In order to successfully reform a naphtha to achieve a product of both high yield and high octane value with little or no addition of lead it is necessary to accomplish as high as possible an octane-barrel value in the reformate.

The present invention realizes a high octane-barrel value (defined as yield in volume fraction of $C_5^+$ gasoline based on feed times the octane number of this yield) in the reformate through the discovery that highest octane-barrel values can be achieved by conserving rather than cracking the very low octane value $C_9$ and $C_{10}$ linear paraffins. It has now been discovered that the avoidance of significant hydrocracking of $C_9$ and $C_{10}$ paraffins in the high pressure platinum catalyst phase by circumventing the third (constant or rising temperature) reactor in the above-described high pressure platinum catalyst reactor series so that the effluent of the second high pressure platinum catalyst reactor containing linear $C_9$ and $C_{10}$ paraffins in a quantity substantially undiminished by hydrocracking is charged directly to the low pressure dehydrocyclization catalyst phase. The $C_9$ and $C_{10}$ paraffins can be selectively aromatized in the substantial absence of hydrocracking by non-isomerizing dehydroaromatization in the dehydrocyclization phase under more mild pressure conditions than is required for dehydroaromatization of linear $C_6$ and $C_7$ paraffins. Since $C_9$ and $C_{10}$ linear paraffins can be selectively dehydroaromatized under more mild pressure conditions than are required for selective dehydroaromatization of $C_6$ and $C_7$ linear paraffins, the dehydrocyclization phase is operated under these more mild pressure conditions at the sacrifice of $C_6$ and $C_7$ aromatics product. It is noteworthy that the dehydroaromatization of $C_8$ paraffins is favored equally by pressure conditions most favorable for dehydroaromatization of $C_6$ and $C_7$ paraffins as by pressure conditions most favorable for dehydroaromatization of $C_9$ and $C_{10}$ paraffins.

The present invention is based upon the discovery that in the dehydrocyclization catalyst phase under mild conditions, especially mild pressure conditions, there is a greater net production of $C_9$ and $C_{10}$ aromatics than the net production of $C_6$ and $C_7$ aromatics. The net production of $C_9$ or $C_9$ plus $C_{10}$ aromatics can be 2, 3, 4 or 5 times or more the net production of $C_6$ or $C_6$ plus $C_7$ aromatics. Moreover, it has been discovered and it is demonstrated herein that improved octane-barrel values are achieved by favoring production of $C_9$ or $C_9$ plus $C_{10}$ aromatics as compared to and at the expense of production of $C_6$ or $C_6$ plus $C_7$ aromatics in the same zone of the dehydrocyclization catalyst. The temperature and pressure conditions in the dehydrocyclization catalyst phase are sufficiently mild that not only are $C_9$ and $C_{10}$ linear paraffins converted to corresponding aromatics while avoiding hydrocracking of these paraffins but also dealkylation of the $C_9$ and $C_{10}$ aromatics which are produced in the dehydrocyclization phase or which are charged to the dehydrocyclization phase is substantially prevented. Furthermore, the conditions in the dehydrocyclization catalyst phase are sufficiently mild so that the achievement of maximum octane-barrel values by production of $C_9$ and $C_{10}$ aromatics is accompanied by achievement of the lowest coke yields of all conditions tested.

Although relatively low acidic or non-acidic chromia is an advantageous dehydrocyclization catalyst at the low pressures of the present invention, any other dehydrocyclization catalyst, such as molybdenum oxide or platinum, can be employed. Mixtures of these catalysts can be used. Any non-cracking support can be employed, such as a high alumina material. With a chromia or molybdena catalyst the dehydrocyclization reaction proceeds by first dehydrogenating the linear paraffin to an olefin and then cyclizing the olefin to an aromatic or alkyl aromatic. With a platinum catalyst the dehydrocyclization reaction proceeds by first cyclizing the linear paraffin to a naphthene, such as cyclohexane or alkyl cyclohexane, and then dehydrogenating the naphthene to the corresponding aromatic.

The same or a different catalyst can be employed in the high pressure naphthene aromatization phase as in the low pressure paraffin aromatization phase. However, the conditions in each phase are selected so that substantially all naphthene aromatization occurs in the high pressure phase and substantially all paraffin dehydrocyclization occurs in the low pressure phase.

In accordance with the present process the final or hydrocarcking reactor of the high pressure platinum catalyst phase is circumvented by a portion or all of the effluent of the first and second high pressure platinum catalyst reactors to conserve the $C_9$ and $C_{10}$ paraffins from the high pressure platinum catalyst phase for feeding to the dehydrocyclization phase. It is a further feature of the present process that when the aromatics produced in the high pressure platinum phase are charged together with the unreacted linear paraffins to the dehydrocyclization phase, the dehydroaromatization of the paraffins in the dehydrocyclization phase is enhanced. The total aromatics effluent from the high pressure platinum catalyst phase should accompany the total paraffin effluent to the dehydrocyclization phase and no solvent extraction or other step for removal of aromatics from paraffins is employed. It has been found that the presence of previously produced aromatics can enhance the yield of $C_9$ and $C_{10}$ aromatics based on feed in the dehydrocyclization phase. It is unexpected that an advantage can be achieved by charging high boiling aromatics to the dehydrocyclization phase because in the presence of a dehydrocyclization catalyst such as chromia dealkylation of $C_{10}$ aromatics can occur. In fact, chromia is known to also be active as a dealkylation catalyst. As shown by the shaded area of FIG. 2, unless extremely mild conditions are employed, $C_{10}$ aromatics dealkylation predominates over $C_{10}$ dehydroaromatization so that there is a net loss rather than a net gain in $C_{10}$ aromatics in a chromia dehydrocyclization phase.

The present process achieves maximum or high $C_5^+$ gasoline octane-barrel values by conserving in the high pressure platinum catalyst phase and converting to aromatics in the dehydrocyclization phase the $C_9$ and $C_{10}$ paraffins that were hydrocracked in the prior art processes. The $C_9$ and $C_{10}$ aromatics produced in accordance with the present process not only have a high octane value but of all the aromatics produced have the highest volumetric yield on a mole for mole basis. When a $C_6$ paraffin is aromatized to benzene the benzene produced has a much higher density than the $C_6$ paraffin so that a considerable loss of yield on a mole for mole basis results. However, when a $C_7$ paraffin is converted to toluene the loss in density is somewhat less because of the methyl group attached to the benzene ring. Similarly, the conversion of $C_8$ paraffin to dimethyl- or ethylbenzene exhibits a still lower loss of density on a mole for mole basis. Finally, the conversion of $C_9$ and $C_{10}$ paraffins to corresponding multi-alkyl group substituted benzenes exhibits the smallest volumetric yield loss of all in the $C_6$ to $C_{10}$ group. It is therefore seen that for purposes of increasing octane values in dehydrocyclization of paraffins the accompanying loss in yield through decrease in molecular density can be diminished by conserving and aromatizing the $C_9$ and $C_{10}$ paraffins in preference to the $C_6$ and $C_7$ paraffins.

Except as explained below, all the reactors of the present invention, including the high pressure acid platinum catalyst reactors and the dehydrocyclization catalyst reactor are operated adiabatically so that a substantial temperature drop occurs along the length of each reactor. The first high pressure platinum catalyst reactor can have a temperature drop of about 100° F., the second a somewhat lower temperature drop of about 60° F. and when the entire effluent from the high pressure platinum catalyst reactors is charged to the inlet of the dehydrocyclization phase reactor the dehydrocyclization phase reactor can have a temperature drop of about 120° F. Because the hydrogen partial pressure in a chromia catalyst dehydrocyclization reactor is preferably below 50 p.s.i. or the dehydrocyclization reaction will become less selective to $C_9$ and $C_{10}$ aromatics, the chromia reactor is especially sensitive to elevated temperatures which could lead to coke deposition. In order to minimize the inlet temperature (the inlet temperature is the highest temperature in each reactor of this process), it is useful to charge the total effluent from the high pressure platinum catalyst phase to the chromia phase so that the large quantity of already produced aromatics can serve as a heat sink for the chromia phase reactants and thereby lower the inlet temperature required to produce a given average temperature throughout the chromia catalyst reactor.

The present invention is more thoroughly set forth below with reference to the accompanying figures in which FIGS. 1, 2, 5, 6, 7, 9, 10A and 10B present graphs illustrating the data of the invention and FIGS. , 4, and 8 present diagrams of process schemes for carrying out the invention.

Figure 2:
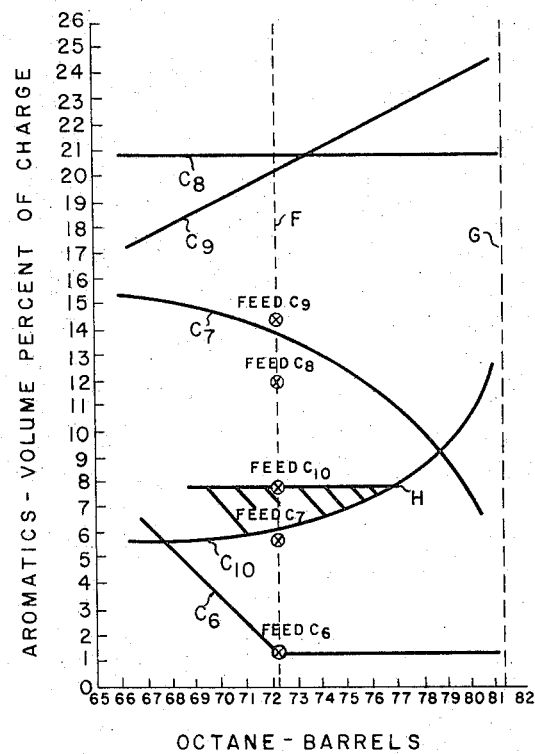

FIG. 2 shows a highly critical phenomenon relating to a dehydrocyclization chromia catalyst phase. Referring to line F of FIG. 2, the volume percent of each aromatic ($C_6$ through $C_{10}$) is indicated for the effluent from the high pressure platinum catalyst phase, which has an octane-barrel value of about 72. Line G of FIG. 2 shows the volume percent of each aromatic ($C_6$ through $C_{10}$) at the maximum octane-barrel level achieved in the chromia dehydrocyclization phase based on the feed to the high pressure acidic platinum catalyst phase. Now, FIG. 2 shows that merely to maintain this same octane-barrel value existing in the feed to the chromia phase in the face of severe operating conditions in the chromia catalyst phase, a substantial increase in $C_7$, $C_8$ and $C_9$ aromatics ($C_6$ aromatics remained unchanged) is required to compensate for a net decrease in $C_{10}$ aromatics. The net decrease in $C_{10}$ aromatics is due to dealkylation since this is the most readily dealkylatable aromatic in the system. Since $C_{10}$ paraffins will hydrocrack under even milder conditions than $C_{10}$ aromatics will dealkylate, dealkylated $C_{10}$ aromatics cannot be replaced by aromatization. Now, the graph of FIG. 2 shows that an increase in $C_6$ and $C_7$ aromatics has a depressant effect upon octane-barrel values because $C_6$ and $C_7$ aromatics can only be produced under conditions which are too severe for the production or retention of $C_9$ and $C_{10}$ aromatics. FIG. 2 shows that $C_9$ and $C_{10}$ aromatics are the only aromatics whose increase tends to have an enhancing effect upon octane-barrel values. The level of $C_8$ aromatics tends to be independent of octane-barrel value. Therefore, to increase octane-barrel values, the chromia dehydrocyclization phase should be generally operated under conditions which tend to increase $C_9$ and $C_{10}$ aromatics, and should be specifically operated under conditions which prevent dealkylation of $C_{10}$ aromatics so that there is a net production of $C_{10}$ aromatics in the chromia phase.

FIG. 2 shows that aromatization per se is not a valuable contribution to octane-barrel values, but only selective aromatization to relatively highly alkylated aromatics, i.e., to $C_9{}^+$ aromatics. But these are the aromatics that are most subject to dealkylation in the chromia phase. The shaded region of FIG. 2 shows that under relatively mild conditions, feed $C_{10}$ aromatics were dealkylated (or partially converted to coke) and the chromia phase did not succeed in achieveing a net increase in $C_{10}$ aromatics via dehydrocyclization of $C_{10}$ paraffins. Point H of FIG. 2 represents the most severe conditions at which $C_{10}$ dehydrocyclization reactions still predominate over $C_{10}$ dealkylation or coking reactions. It is only under increasingly mild conditions and sometimes over only a portion of a catalyst cycle, such as when the catalyst is fresh and the temperature drop is high, that $C_{10}$ dehydroaromatization reactions predominate over $C_{10}$ dealkylation reactions to produce a net increase in $C_{10}$ aromatics in the system. Even if $C_{10}$ dealkylation reactions predominate over only a portion of a catalyst cycle, FIG. 2 shows that if the $C_{10}$ dealkylation loss is small an octane-barrel improvement in the chromia phase can still be achieved. For example, the $C_{10}$ aromatics in the feed may improve $C_9$ dehydroaromatization to achieve the octane-barrel improvement.

Since the dehydrocyclization phase of this invention is operated under conditions to dehydrocyclize $C_{10}$ paraffins to aromatics and these aromatics are actually recovered without being dealkylated, the $C_{10}$ and lower aromatics produced in the high pressure platinum catalyst phase can safely be passed through the dehydrocyclization catalyst phase together with the paraffin. If dealkylation conditions were utilized in the dehydrocyclization phase it would be necessary to solvent extract the aromatics produced in the high pressure platinum catalyst phase from the paraffin fed to the dehydrocyclization phase. But the $C_{10}$ aromatics curve of FIG. 2 shows that under the high octane-barrel value conditions of this invention $C_{10}$ aromatic dealkylation is avoided, permitting $C_{10}$ aromatics produced in the high pressure platinum catalyst phase to be charged to the dehydrocyclization phase without undergoing a net loss in volume. In this manner, not only is use of an aromatics-paraffin separation step avoided but also the aromatics introduced to the dehydrocyclization phase advantageously provides a heat reservoir so that relatively mild inlet temperatures can be utilized in an adiabatic dehydrocyclization chamber. This feature itself in turn contributes to avoiding dealkylation conditions at the reactor inlet. Finally, data presented below show that the presence of a high carbon-number aromatic in the feed actually enhances production of a fresh similar carbon-number aromatic in the dehydrocyclization phase. Point H of FIG. 2 represents the conditions at which the advantage of this effect terminates for a $C_{10}$ material, i.e. enhanced $C_{10}$ conversion to aromatics due to charging $C_{10}$ aromatics is impossible where there is a net $C_{10}$ aromatics loss rather than gain. The process of this invention can avail itself of these advantages because the dehydrocyclization phase is operated under conditions under which the $C_{10}$ aromatics are not dealkylated.

An important showing of FIG. 2, in conjunction with the data of Table 1, is that there are two distinct paths available in the operation of the dehydrocyclization phase, each of which is incompatible with the other. The first path is the method of the prior art wherein relatively severe conditions are employed to achieve a high total conversion of paraffins and cycloparaffins to aromatics. This mode of operation provides highest yields of $C_6$ and $C_7$ aromatics and lowest yields of $C_9$ and $C_{10}$ aromatics together with a loss in octane-barrel value for the operation. This condition is illustrated in FIG. 2 at an octane-barrel value of about 67 whereat the volume percent based on feed of $C_6$ and $C_7$ aromatics is the highest while the volume percent based on feed of $C_9$ aromatics is the lowest and the degree of dealkylation of $C_{10}$ aromatics is the greatest, so that there is essentially no net volumetric increase in $C_9$ and $C_{10}$ aromatics. In contrast, at a high octane-barrel value of about 81, there is essentially no volumetric increase in $C_6$ and $C_7$ aromatics while the net volumetric increase in $C_9$ and $C_{10}$ aromatics is at its highest. To achieve an octane-barrel value of 81, operating conditions are the mildest so that total conversion of paraffins and cycloparaffins to aromatics is low. Therefore, the dehydrocyclization phase of the present invention operates under conditions conducive to a relatively higher (by 2, 3, 4, 5 or 10 times or more) net volumetric increase in $C_9$ and $C_{10}$ aromatics as compared to the volumetric increase in $C_6$ and $C_7$ aromatics. Specifically, there is a higher net volumetric increase in $C_{10}$ aromatics as compared to the net volumetric increase in $C_6$ aromatics and there is a higher net volumetric increase in $C_9$ aromatics as compared to the volumetric increase in $C_7$ aromatics. It is apparent that for the successful operation of the dehydrocyclization phase in accordance with the present invention, sufficient $C_9$ and $C_{10}$ paraffins and naphthenes must be conserved in the high pressure platinum catalyst phase and charged to the dehydrocyclization phase to accomplish the high net volumetric increase in $C_9$ and $C_{10}$ aromatics.

Figure 6:
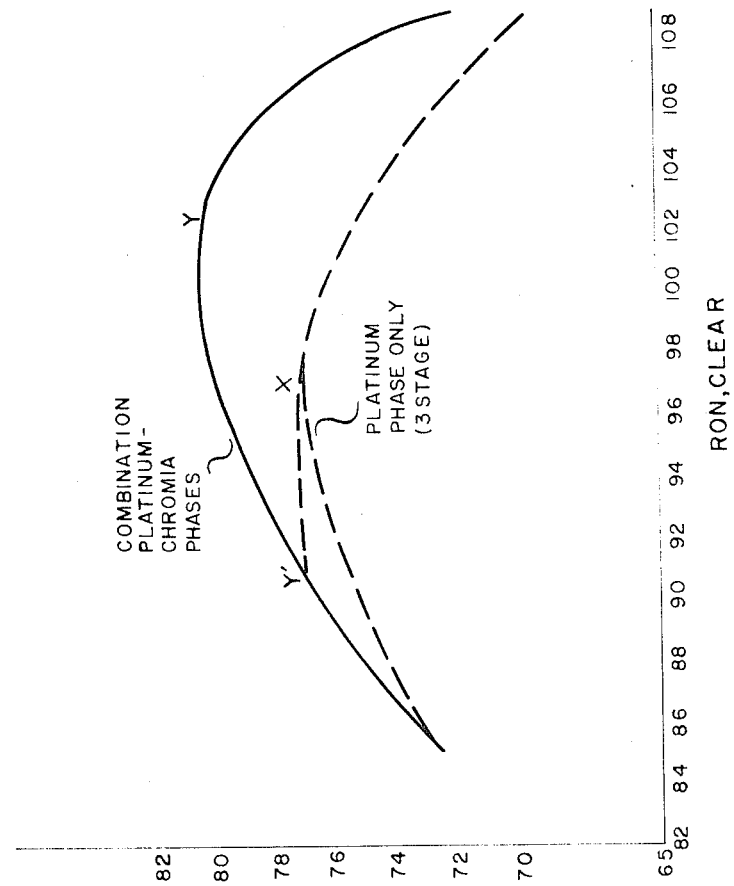

A fuller understanding of FIG. 2 can be realized by reference to FIG. 6. The lower curve of FIG. 6 shows the relationship of gasoline octane-barrels to average research octane number, clear, in a three-stage reformer system utilizing an acidic platinum catalyst at a high pressure in each stage. The upper curve of FIG. 6 shows the relationship in a similar system except that a single low pressure chromia stage is substituted for the third (hydrocracking) high pressure platinum stage and the entire $C_6$ to $C_{10}$ paraffinic and aromatic effluent of the second high pressure platinum stage is charged to the upstream end of the single low pressure chromia stage.

Maximum point Y in FIG. 6 shows that the upper curve, representing the coordinated high pressure platinum and low pressure chromia system of the present process, can achieve an exceptionally high octane barrel value (81) and it achieves this value at an exceptionally high octane number (101). Comparing maximum point Y with maximum point X of the lower curve, it is seen that the system of the present invention can achieve a higher peak octane-barrel value (81) than the peak octane-barrel value of the three-stage high pressure platinum system (77), and it achieves this higher octane-barrel value at a higher average octane number (101) than that represented by point X (97). Therefore, the present invention is advantageous in regard to both octane-barrel value and octane number.

Comparing points X and Y' of FIG. 6, it is seen that the present process can be operated less efficiently than the three-stage high pressure platinum process unless full advantage of the dehydrocyclization phase is achieved. Point Y', representing a non-optimum point of the dehydrocyclization system operation, indicates the same octane-barrel value as point X, but at a lower average octane number. Therefore, it is an objective of the present process to operate the combination high pressure platinum-low pressure dehydrocyclization system as near to optimum point Y as possible. As noted above, extremely mild conditions in the dehydrocyclization phase will permit attainment of the optimum value Y, but the important aspect of the process of the present invention is avoidance of the steep fall-off of the upper curve of FIG. 6 as denoted by the portion of the upper curve to the right of point Y. The steep portion of the upper curve to the right of point Y is avoided by operating the dehydrocyclization phase at very mild conditions.

In this regard, it is noted that the curves of FIG. 2 represent the content of the various species of aromatics in the product represented only by that portion of the upper curve of FIG. 6 to the right of point Y. This will become more apparent by reference to FIG. 7 in which the solid lines exactly correspond to the solid lines of FIG. 2, and represent the relatively high severity operation occurring to the right of point Y of FIG. 6. Vertical line G of FIG. 7 corresponds to optimum point Y of FIG. 6. The dashed lines of FIG. 7, not present in FIG. 2, represent the content of each aromatic species represented only by that portion of the upper curve of FIG. 6 to the left of point Y.

Figure 7:
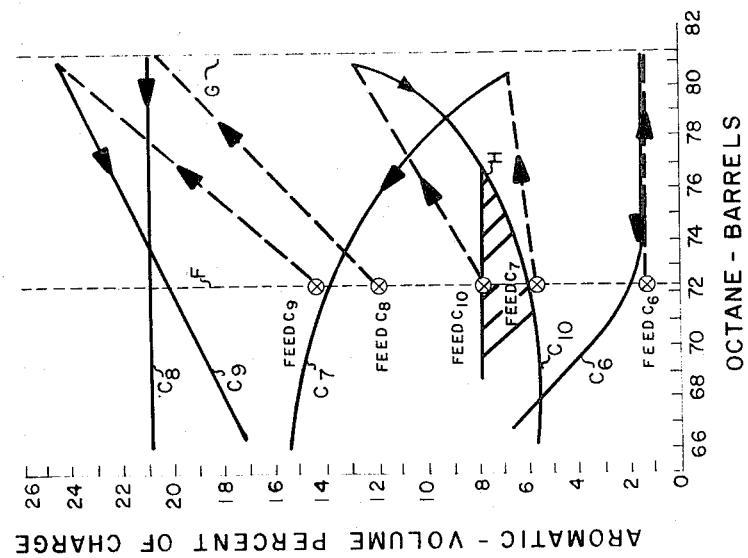

Now, considering FIG. 7, the amount of each aromatic species in the product can be traced from its content in the feed to the dehydrocyclization phase, as represented by vertical line F of FIG. 7, through its content in the gradually ascending portion of the upper curve of FIG. 6 to the left of point Y, as represented by the dashed lines of FIG. 7, to the peak-point Y, itself, as represented by the vertical line G of FIG. 7, and through the steep fall-off region of the upper curve of FIG. 6 to the right of point Y, as represented by the solid lines in FIG. 7. This path from the left-hand region of the upper curve of FIG. 6 through the peak Y to the right hand region of the curve is represented by the arrows in the dashed and solid curves for each aromatics species in FIG. 7. In FIG. 7, for each aromatic species the arrows trace a path from the feed content of that species at line F through the dashed lines to line G corresponding to the optimum content for the species, and then through the solid lines away from the optimum point.

An important feature of the present invention is apparent by reference to FIG. 7. This feature is that the dashed lines (representing mild conditions) all tend to slope in the same direction (except that the $C_6$ line is flat). Therefore, with increasing octane-barrel levels in the dehydrocyclization chromia phase all aromatic species (except $C_6$) tend to increase. However, the dashed lines of FIG. 7 represent octane numbers below 101 (to the left of peak point Y in FIG. 6). On the other hand, in regard to the solid lines of FIG. 7, which represent octane numbers of 101+ (to the right of peak point Y in FIG. 6) the curves for $C_9$ and $C_{10}$ aromatics have a different slope than the curves for the $C_6$ and $C_7$ aromatics. It is only in the high octane range (101 to 107) that the difference in slope for the curves of the $C_9$ and $C_{10}$ aromatics species inures.

The following table is extracted from FIG. 7 and shows the aromatics distribution obtaining in the dehydrocyclization feed and at the maximum and lowest product octane-barrel levels shows in FIG. 7.

|  | Volume percent of charge | | | |
| --- | --- | --- | --- | --- |
| Octane-barrels | $C_6+C_7$ aromatics | $C_8$ aromatics | $C_9+C_{10}$ aromatics | Total $C_6-C_{10}$ aromatics |
| 72 (feed) | 7 | 12 | 22 | 41 |
| 81 (max.) | 8 | 21 | 37 | 66 |
| 67 (lowest) | 22 | 21 | 22 | 65 |

The above table shows that when achieving maximum octane-barrels, $C_9$ plus $C_{10}$ aromatics increased 15 percent compared with feed levels while there was little change in $C_6$ plus $C_7$ aromatics content. On the other hand, at the lowest octane-barrel level there was no change in $C_9$ plus $C_{10}$ aromatics content compared with feed levels but $C_6$ plus $C_7$ aromatics increased 15 percent. It is interesting that total $C_6$ through $C_{10}$ aromatics content as well as $C_8$ aromatic content was about the same at both maximum and lowest octane-barrels levels in dicating that octane-barrel level is substantially determined by relative make of $C_9$ plus $C_{10}$ aromatics versus $C_6$ plus $C_7$ aromatics. The above table shows that at a 15 percent increase in $C_9$ plus $C_{10}$ aromatics content ($C_6+C_7$ aromatics remaining nearly unchanged), the octane-barrel level increased 9 points while at a 15 percent increase in $C_6$ plus $C_7$ aromatics content ($C_9+C_{10}$ aromatics remaining unchanged), the octane-barrel level decreased five points. As noted above, in a unitary reaction zone production of $C_9$ and $C_{10}$ aromatics is incompatible with production of $C_6$ and $C_7$ aromatics. However, in a dual dehydrocyclization zone it is apparent that the zone producing $C_6$ plus $C_7$ aromatics will tend to impart an octane-barrel loss and if there is to be an overall gain in octane-barrel level for the total product this loss will have to be overcome by a relatively greater gain in the $C_9$ plus $C_{10}$ aromatics-producing reactor or by a relatively greater flow to the $C_9$ plus $C_{10}$ aromatics-producing reactor.

FIG. 2 and the solid lines of FIG. 6 show that at high octane numbers, i.e., RON clear, above 98 to 101, a high volumetric production and recovery of $C_9$ and $C_{10}$ aromatics is incompatible with a concomitant high volumetric increase in $C_6$ and $C_7$ aromatics, and vice versa, because the slope of the curves for $C_9$ and $C_{10}$ aromatics is opposite from that for $C_6$ and $C_7$ aromatics. Therefore, a modification of this process is described below which represents a means for achieving high production and recovery of $C_9$ and $C_{10}$ aromatics as well as $C_6$ and $C_7$ aromatics in spite of the opposing curve slopes appearing in FIGS. 2 and 7. The modification has utility in situations where some decrease in octane-barrel value is acceptable in favor of higher octane number or where the extra benzene and toluene product is bled out of the gasoline stream for use as a chemical.

Although the data presented below relating to chromia phase operation were taken under isothermal conditions, in commercial installations these reactors are most conveniently operated adiabatically with a temperature drop occurring along the length of the reactor. Adiabatic operation presents a severe disadvantage not present in isothermal operation. FIG. 2 shows that at maximum octane-barrel values production of $C_9$ and $C_{10}$ aromatics is enhanced but little or no $C_6$ and $C_7$ aromatics are produced. As stated, to achieve this effect very mild conditions are employed so that the readily crackable $C_9$ and $C_{10}$ paraffins are aromatized without being cracked, and these conditions are so mild that the less reactive $C_6$ and $C_7$ paraffins are not aromatized.

The dehydroaromatization of $C_9$ and $C_{10}$ linear paraffins under adiabatic conditions presents a severe problem in that to achieve a desired average reactor temperature it is necessary to charge the $C_9$ and $C_{10}$ linear paraffins at an elevated temperature at which cracking is likely, possibly causing loss of $C_9$ and $C_{10}$ paraffins via hydrocracking prior to being aromatized. Isothermal operation is not a practical alternative because this entails heating the reactor during operation.

An advantageous mode of operation for the dehydrocyclization reactor is presented which provides for not only aromatization and recovery of the $C_9$ and $C_{10}$ paraffins under the desired mild conditions but also provides for aromatization and recovery of $C_6$ and $C_7$ paraffins which would not otherwise occur under these mild conditions. Although this mode of operation occurs in an adiabatic reactor, the operation permits reaction of $C_9$ and $C_{10}$ paraffins to be isolated in a downstream catalyst zone so that reaction of $C_9$ and $C_{10}$ paraffins advantageously occurs under relatively lower temperature conditions than if the entire feed were charged to the upstream end of an adiabatic reactor.

According to this mode of operation, the effluent from the high pressure platinum catalyst phase in which at least about 90 or 95 percent of the total naphthene content has already been converted to aromatics is fractionated to separate $C_9$ and $C_{10}$ materials, including $C_9$ and $C_{10}$ saturates and aromatics, from $C_6$ and $C_7$ saturates and aromatics. The $C_8$ material can be split between the two fractions, but most desirably is included with the lighter material. The $C_6$, $C_7$ and $C_8$ saturates and aromatics, together with a major proportion of the hydrogen recycle, are charged at a relatively high temperature of 950 to 1050° F. to the top of the dehydrocyclization catalyst bed, while the $C_9$ and $C_{10}$ saturates and aromatics with a minor proportion of the total recycle hydrogen at a relatively lower temperature of 900 to 1000° F. are fed to a position relatively downstream in the reactor. As stated, conversion of feed five carbon-member ring naphthenes is at least 90 or 95 percent completed in the high pressure phase and at the low dehydrocyclization pressure no further naphthene aromatization or other isomerization occurs. In another embodiment explained below, the $C_6$, $C_7$ and $C_8$ fraction is charged to a relatively small upstream reactor and thence to a larger downstream reactor in series, while the $C_9$ and $C_{10}$ fraction is charged directly to the downstream reactor.

Each fraction reacts relatively completely upon its initial contact with the catalyst. The lighter $C_6$, $C_7$ and $C_8$ fraction is aromatized at a temperature starting at its relatively high inlet temperature and thereby induces a temperature drop in the reactor to a relatively low temperature. Since the $C_6$, $C_7$ and $C_8$ paraffins are aromatized at a relatively high temperature they are charged with a relatively high ratio of hydrogen to hydrocarbon to protect against excessive cracking and coke formation. The hydrogen to hydrocarbon mole ratio will be increased upon approaching the position of entry of $C_9$ and $C_{10}$ paraffins downstream in the reactor due to the dehydrocyclization of the $C_6$, $C_7$ and $C_8$ paraffins.

The $C_9$ and $C_{10}$ materials will be charged at the position in the reactor at which the temperature drop due to dehydrogenation reactions of the $C_6$, $C_7$ and $C_8$ paraffins is substantially complete. The $C_9$ and $C_{10}$ paraffins introduce heat into the system but still the reaction of the $C_9$ and $C_{10}$ paraffins will occur at a lower temperature than the temperature of reaction of the $C_6$, $C_7$ and $C_8$ paraffins to accomplish efficient aromatization of $C_9$ and $C_{10}$ materials with minimum cracking. Since reaction of $C_6$, $C_7$ and $C_8$ linear paraffins to olefins and aromatics is substantially terminated at the temperature and position in the catalyst bed at which $C_9$ and $C_{10}$ materials are charged, although not all the $C_6$, $C_7$ and $C_8$ linear paraffins are converted the low molecular weight material serves as a heat reservoir or heat sink to supply heat and maintain a relatively constant temperature for the $C_9$ and $C_{10}$ dehydroaromatization. Furthermore, under this arrangement the $C_9$ and $C_{10}$ paraffins react on catalyst which is free of coke produced by the earlier and higher temperature reaction of the $C_6$, $C_7$ and $C_8$ material. Finally, the $C_9$ and $C_{10}$ aromatics produced in the high pressure platinum catalyst phase are charged together with the $C_9$ and $C_{10}$ linear paraffins from the high pressure platinum catalyst phase, which provides a further heat sink for supplying heat to maintain a relatively constant temperature during the dehydroaromatization of $C_9$ and $C_{10}$ materials. All of these conditions permit the $C_9$ and $C_{10}$ paraffins to aromatize at relatively isothermal (or partially isothermal) conditions while permitting the less critical aromatization of $C_6$, $C_7$ and $C_8$ materials to occur under more adiabatic conditions.

Relatively isothermal dehydroaromatization of $C_9$ and $C_{10}$ materials in the dehydrocyclization phase is important because otherwise the highly crackable $C_9$ and $C_{10}$ linear paraffins would have to be charged at a relatively high temperature to achieve a desired average temperature and at the higher inlet temperature the $C_9$ and $C_{10}$ saturates would be cracked before they could be aromatized. It is an important advantage of the split feed mode of operation of the dehydrocyclization phase reactor that the relatively isothermal conditions for dehydroaromatization of $C_9$ and $C_{10}$ materials is achieved without the inconvenience and expense of heating the reactor during the reaction.

There is a further very important advantage in the split feed method of dehydrocyclization phase operation. The dehydroaromatization of $C_9$ and $C_{10}$ paraffins to aromatics is enhanced by the presence of $C_9$ and $C_{10}$ and lower aromatics introduced with the feed. According to the split feed method of operation, not only are all the aromatics produced in the high pressure platinum catalyst phase present during $C_9$ and $C_{10}$ dehydroaromatization, but also all the $C_6$, $C_7$ and $C_8$ aromatics produced in the dehydrocyclization catalyst phase are also present. By this arrangement all the other aromatics produced anywhere in the coordinated catalyst system are advantageously produced in the advance of and are present during $C_9$ and $C_{10}$ dehydroaromatization in the dehydrocyclization phase so that the maximum possible advantage due to the presence of aromatics in the feed is achieved.

The platinum group catalyst for the high pressure phase is acidic and therefore possesses isomerization and hydrocracking activity in addition to dehydrogenation activity. The catalyst can be rendered acidic by acid treatment during preparation or when it is onstream. A halogen acid such as hydrogen chloride or fluoride can be used for such treatment. Platinum-group catalysts include platinum, palladium, rhodium and iridium. The platinum-group metal can be used with rhenium, if desired. Platinum is preferred. Alumina is a suitable support. Examples of platinum phase catalysts include platinum-alumina-combined halogen, wherein the halogen content lies within the range of from about 0.1 to 3 percent by weight of the total catalyst, platinum comprises from about 0.01 to about 3 percent by weight, but preferably 0.05 to 1 weight percent. A suitable range for combined fluorine is about 0.1 to 2 or 4 weight percent, preferably the narrower range, while a suitable range for combined chlorine is about 0.1 to 4 or 8 weight percent, preferably the narrower range. Since the platinum catalyst itself is conventional and is not a part of the invention, these ranges are for example only.

The dehydrocyclization phase can utilize as a catalyst any known dehydrocyclization catalyst. These catalysts include oxides of Group VI metals such as chromium and molybdenum and mixtures of these oxides. Platinum can also be used. The order of preference is platinum, chromia and molybdena. The catalyst is disposed on a non-cracking support such as alumina and the chromia or molybdena catalyst can contain a minor amount of sodium or potassium. A typical catalyst contains about 6 to 25 weight percent and preferably about 10 to 20 weight percent of chromia ($Cr_2O_3$) promoted with about 0.1 to 10 weight percent and preferably about 0.6 to 1.5 weight percent of sodium oxide ($Na_2O$) or potassium oxide ($K_2O$) on an inert carrier such as alumina. A typical platinum catalyst is promoted with halogen and can have the same composition as the high pressure phase catalyst. Also, both platinum catalysts can contain germanium.

The feed to the process of this invention can be a naphtha or a heavy naphtha such as a straight run naphtha or any gasoline range hydrocarbon such as a cracked gasoline which can be upgraded by reforming. The boiling range of the feed can be from below 150 to 350° F., 400° F. or 450° F. The feed should contain $C_6$ through $C_{10}$, or even $C_{11}$ and $C_{12}$ naphthenes and paraffins capable of conversion to the corresponding $C_6$ to $C_{10}$ or $C_{11}$ and $C_{12}$ naphthenes and paraffins capable of conversion to the corresponding $C_6$ to $C_{10}$ or $C_{11}$ and $C_{12}$ aromatics.

A series of tests were performed to illustrate the present invention. The feed in the tests was a pretreated straight run Kuwait naphtha having the following inspections:

| | |
|---|---|
| Gravity, API D287 | 58.0 |
| Nitrogen, p.p.m. | 0.2 |
| Sulfur, p.p.m. | 1 |
| Bromine No. D1159 | 0.1 |
| Distillation, D86, ° F.: | |
| Oven point | 210 |
| End point | 380 |
| Pct. condensed 760 mm. Hg: | |
| 10 | ° F__ 234 |
| 30 | ° F__ 254 |
| 50 | ° F__ 276 |
| 70 | ° F__ 302 |
| 90 | ° F__ 334 |

| Composition: | Percent by vol. |
|---|---|
| Paraffins | 64 |
| Cycloparaffins | 21.3 |
| Bicycloparaffins | 1.7 |
| Benzene | 0.2 |
| Toluene | 1.3 |
| $C_8$ alkylbenzenes | 3.8 |
| $C_9$ alkylbenzenes | 5.1 |
| $C_{10}$ alkylbenzenes | 2.6 |
| RON, clear | 35–40 |

The analytical method used in obtaining feed and product data throughout this application included $C_{11}$ and $C_{12}$ materials in the measurement of $C_{10}$ aromatics reported. Independent measurements indicated that some $C_{11}$ and $C_{12}$ materials were present.

The naphtha feed was passed in its entirety through the entire catalyst bed of a simulated system comprising two high pressure acidic platinum-alumina-chlorine catalyst reactors of equal size in series to produce a product having the composition and properties shown in Column A of Table II. The reaction conditions, which were the same in each reactor, are also shown in Column A. Each reactor was operated isothermally. The $C_5^+$ product shown in Column A comprised about 85 percent of the volume of the above feed and has a Research Octane Number (RON), clear, of about 85 and a $C_5^+$ octane-barrel value of 72.29.

Table I, in the column entitled "Feed," shows an analysis of the high pressure platinum catalyst phase total effluent presented in Column A of Table II on an essentially depentanized basis. The various tests of Table I show the results of treating this platinum catalyst phase effluent under various conditions in a low pressure chromia-alumina-sodium catalyst phase. Table II shows the same results as the tests of Table I except that all yields are reported on the basis of the coordinated two-reactor high pressure platinum catalyst phase together with the low basis of the chromia catalyst phase alone.

The catalyst utilized in the chromia phase of the tests was alkaline and comprised 12 percent by weight of $Cr_2O_3$ and 1.5 weight percent of sodium oxide supported on 1/16 inch extrudates of gamma alumina.

The data of Tables I and II were taken by passing the total $C_6^+$ effluent from a second stage high pressure platinum-alumina-chlorine reformer to the top of a single low pressure chromia catalyst reactor operated isothermally so that the total stream passes through the entire chromia catalyst bed. A swing reactor was utilized in a similar manner to allow for periodic chromia catalyst regeneration. This high pressure platinum phase effluent was depentanized before entering the low pressure chromia catalyst phase and was charged to the chromia phase with the total hydrogen produced in the platinum phase.

Unexpectedly, very mild processing conditions in the chromia phase produces the best combination of octane improvement and yield. The optimum operating conditions were found to be an average temperature of 900 to 950° F., preferably 900 to 925° F., a pressure of 5 to 20 p.s.i.g. and a 0.2 to 5 $H_2$/HC mole ratio, preferably a 1 to 4 $H_2$/HC mole ratio. The LHSV should be established to obtain less than 65 to 75 and preferably between 25 and 50 percent linear paraffins conversion to aromatics or to aromatics and other materials. Generally, space velocities of 0.5 to 2.0 are useful. High reactor inlet temperatures of 950 or 975 to 1000° F. are necessary to obtain the advantage of high $H_2$/HC mole ratios, i.e. $H_2$/HC mole ratios as high as 2 or 3, or above. The advantage of high $H_2$/HC mole ratios is not realized at lower temperatures. The HC term in the $H_2$/HC mole ratio refers to total hydrocarbon in the feed stream, excluding hydrocarbon in the recycle hydrogen gas. The inlet temperature in each dehydrocyclization phase reactor is preferably but not necessarily higher than the inlet temperature to each high pressure platinum phase reactor in the combination system.

It is advantageous to use pressures below 50 p.s.i.g., generally, and below 30 or 40 p.s.i.g., preferably, when the dehydrocyclization catalyst is chromia. Pressures below 20 or 25 p.s.i.g. are especially advantageous. Dehydrocyclization is favored by low pressure. The maximum operable pressure will depend on the particular dehydrocyclization catalyst. When chromia is employed, the pressure can be 100 p.s.i. or less, while when molybdena is employed the pressure can be 150 p.s.i. or less and when platinum is employed the pressure can be 175 or 200 p.s.i., or less. The pressure in each dehydrocyclization zone is lower than the pressure in any high pressure platinum reactor in the combination system. Furthermore, data are presented below which show that no matter which dehydrocyclization catalyst is employed, the lower the pressure the more the production of $C_9^+$ aromatics is favored over the production of $C_6$ and $C_7$ aromatics. By way of contrast, in the high pressure phase, while pressures as low as 225 or 250 p.s.i. can be employed, higher pressures are advantageous because they generally do not inhibit the reaction but they do considerably reduce coke formation.

At these mild conditions, operations in the chromia phase are greatly simplified due to very slight coke deposition on the catalyst. Although the catalyst has about a 24 hour cycle, the process can be performed in one reactor with one swing reactor since the regeneration cycle is shorter than the reaction cycle.

TABLE I $Cr_2O_3/Al_2O_3$ Phase Operating Data and Yields

| | Feed | 145 | | 149 | | 146 | | 147 | | 150 | |
|---|---|---|---|---|---|---|---|---|---|---|---|
| | | 1[1] | 2[1] | 1[1] | 2[1] | 1[1] | 2[1] | 1[1] | 2[1] | 1[1] | 2 |
| Operating conditions: | | | | | | | | | | | |
| Temperature, °F | 1,029.7 | 1,031.8 | 951.3 | 950.0 | 902.9 | 901.9 | 903.6 | 902.5 | 924.5 | 920.7 | |
| Pressure, p.s.i.g | | 5.0 | 5.0 | 5.0 | 5.0 | 6.0 | 6.0 | 20.0 | 20.0 | 12.5 | 12.5 |
| LHSV, vol./vol | | 0.442 | 0.468 | 0.483 | 0.502 | 0.262 | 0.281 | 0.473 | 0.494 | 0.34 | 0.377 |
| $H_2$/HC, mole/mole | | 1.17 | 1.09 | 1.07 | 0.97 | 0.98 | 0.92 | 1.08 | 1.04 | 1.13 | 1.02 |
| Recovery, wt. percent | | 94.14 | 94.69 | 99.71 | 95.63 | 94.04 | 98.92 | 101.19 | 96.92 | 96.98 | 94.56 |
| Gas yields: | | | | | | | | | | | |
| $H_2$, s.c.f./bbl | 1,160.6 | 860.9 | 942.3 | 791.4 | 831.8 | 736.0 | 442.9 | 424.9 | 866.7 | 704.7 | |
| $H_2$, wt. percent of charge | | 2.22 | 1.66 | 1.81 | 1.52 | 1.59 | 1.41 | 0.84 | 0.81 | 1.66 | 1.35 |
| $C_1$, wt. percent of charge | | 2.64 | 2.52 | 0.77 | 0.71 | 0.52 | 0.39 | 0.32 | 0.30 | 0.58 | 0.52 |
| $C_2$, wt. percent of charge | | 2.89 | 2.78 | 0.93 | 0.87 | 0.62 | 0.42 | 0.43 | 0.42 | 0.73 | 0.64 |
| $C_3$, wt. percent of charge | | 3.59 | 2.96 | 0.77 | 0.78 | 0.61 | 0.41 | 0.40 | 0.38 | 0.72 | 0.74 |
| $C_3=$, wt. percent of charge | | 0.45 | 1.25 | | | | | | | | |
| $nC_4$, wt. percent of charge | | 2.09 | 1.96 | 1.02 | 0.91 | 0.32 | 0.24 | 0.54 | 0.49 | 0.94 | 0.56 |
| $iC_4=$, wt. percent of charge | | 1.98 | 1.81 | | 0.23 | | | 0.09 | 0.21 | 0.18 | 0.19 |
| $C_5$, wt. percent of charge | | 2.06 | 0.76 | | 0.25 | | | 0.04 | 0.07 | 0.49 | 0.21 |
| $C_5=$, wt. percent of charge | | 1.30 | 1.12 | | | | | | | | |
| Coke yield, wt. percent of charge | | 3.68 | 3.70 | 1.43 | 1.49 | 1.46 | 1.39 | 0.43 | 0.44 | 0.83 | 0.85 |
| Liquid yields: | | | | | | | | | | | |
| $C_5+$, vol. percent of charge | 100.0 | 73.8 | 78.3 | 89.21 | 90.20 | 91.62 | 92.75 | 95.39 | 95.54 | 90.56 | 91.84 |
| $C_5+$, wt. percent of charge | 98.9 | 77.07 | 79.49 | 93.23 | 93.18 | 94.86 | 95.76 | 96.89 | 96.85 | 93.84 | 94.91 |
| $C_6+$, vol. percent of charge | 98.6 | 71.30 | 75.46 | 89.21 | 89.88 | 91.62 | 92.75 | 95.39 | 95.54 | 89.94 | 91.58 |
| Saturates, vol. percent of charge | 49.72 | 4.75 | 13.91 | 18.52 | 23.38 | 24.83 | 26.99 | 35.49 | 35.22 | 22.75 | 26.575 |
| Olefins, vol. percent of charge | 0.0 | 1.38 | 2.22 | 5.10 | 3.61 | 3.67 | 4.32 | 3.79 | 3.80 | 2.68 | 3.66 |
| $C_6$ aromatics, vol. percent of charge | 1.68 | 6.45 | 2.07 | 0.77 | 0.71 | 0.20 | 0.44 | 0.47 | | 4.23 | 0.62 |
| $C_7$ aromatics, vol. percent of charge | 6.82 | 15.22 | 11.11 | 8.54 | 8.19 | 6.68 | 10.27 | 7.05 | 2.22 | 9.58 | 5.91 |
| $C_8$ aromatics, vol. percent of charge | 14.26 | 20.70 | 21.03 | 21.99 | 21.09 | 21.08 | 22.00 | 17.88 | 18.46 | 20.95 | 22.04 |
| $C_9$ aromatics, vol. percent of charge | 16.89 | 17.50 | 18.84 | 24.48 | 23.48 | 22.89 | 21.62 | 19.88 | 25.75 | 21.27 | 24.66 |
| $C_{10}$ aromatics, vol. percent of charge | 9.23 | 5.30 | 6.26 | 9.82 | 9.42 | 12.59 | 7.10 | 10.82 | 10.08 | 8.98 | 8.65 |
| Aromatics, vol. percent of charge | 65.17 | 59.32 | 65.59 | 62.89 | 63.12 | 61.44 | 56.10 | 56.52 | 65.02 | 61.34 | |
| Aromatics, vol. percent $C_6+$ | 91.38 | 78.61 | 73.52 | 69.23 | 68.89 | 66.24 | 58.81 | 59.16 | 72.29 | 66.98 | |
| Octane number, RON, clear | 107.1 | 105 | 104.1 | 103.5 | 102.5 | 100.5 | 98.7 | 99 | 102.4 | 102.4 | |
| Paraffin-cycloparaffin conversion, percent:[a] (Par.+CP Chg.−Par.−CP Rec.) 100/Par.+CP Chg | | 90.15 | 71.31 | 61.50 | 51.3 | 48.29 | 43.80 | 25.88 | 26.81 | 53.40 | 43.64 |
| Wt. selectivities based on [a] par.-cyclopar. conv., percent: | | | | | | | | | | | |
| $H_2$ | | 5.71 | 5.39 | 6.86 | 6.87 | 7.73 | 7.49 | 7.65 | 7.06 | 7.2 | 7.22 |
| Aromatics | | 37.38 | 26.09 | 57.03 | 54.57 | 59.52 | 55.78 | 41.14 | 42.99 | 62.83 | 55.14 |
| $C_6+$ Olefins | | 3.27 | 6.56 | 17.36 | 14.65 | 16.01 | 21.15 | 30.89 | 29.77 | 10.49 | 17.68 |
| $C_1–C_5$ HC | | 44.08 | 49.81 | 13.29 | 17.12 | 10.05 | 7.75 | 16.41 | 16.29 | 15.84 | 15.37 |
| Coke | | 9.51 | 12.15 | 5.45 | 6.78 | 6.68 | 7.33 | 3.90 | 3.87 | 3.61 | 4.57 |
| Par-cyclopar. conversion, percent: (Par.+CP[b] Chg.−Par.−CP−Olef. Recov.) 100/Par.+CP Charge | | 87.20 | 66.42 | 50.92 | 43.83 | 40.59 | 34.36 | 17.88 | 18.80 | 48.00 | 35.92 |
| Weight selectivities based on [b] conversions: | | | | | | | | | | | |
| $H_2$ | | 5.95 | 5.75 | 8.42 | 7.86 | 9.69 | 9.53 | 11.06 | 9.70 | 7.82 | 8.83 |
| Aromatics | | 38.65 | 27.93 | 68.92 | 64.08 | 70.49 | 71.22 | 59.54 | 61.46 | 70.39 | 66.96 |
| $C_1–C_5$ HC | | 45.57 | 53.32 | 16.07 | 20.10 | 11.90 | 9.89 | 23.75 | 23.30 | 17.74 | 18.66 |
| Coke | | 9.83 | 13.00 | 6.59 | 7.96 | 7.92 | 9.36 | 5.65 | 5.54 | 4.05 | 5.55 |
| C on catalyst, gm. C/100 gm. cat | | | 8.72 | | 3.62 | | 3.48 | | 1.25 | | 2.04 |
| Regeneration time, hr | | | 19.5 | | 8.5 | | 4.5 | | 2.5 | | 2.75 |
| Period length, hr | | 2 | 2 | 2 | 2 | 4 | 4 | 2 | 2 | 3 | 3 |

$Cr_2O_3/Al_2O_3$ Phase Operating Data and Yield

| | Feed | 151 | | 152 | | 153 | | 154 | | 155 | |
|---|---|---|---|---|---|---|---|---|---|---|---|
| | | 1[1] | 2[1] | 1[1] | 2[1] | 1[1] | 2[1] | 1[1] | 2[1] | 1[1] | 2[1] |
| Operating conditions: | | | | | | | | | | | |
| Temperature, °F | | 949.6 | 951.4 | 955.9 | 954.8 | 1,030.8 | 1,037.1 | 950.5 | 950.2 | 1,034.8 | 1,031.7 |
| Pressure, p.s.i.g | | 21.0 | 21.0 | 5.0 | 5.0 | 5.0 | 5.0 | 5.0 | 5.0 | 6.0 | 6.0 |
| LHSV, vol./vol | | 0.254 | 0.252 | 0.245 | 0.252 | 0.975 | 0.966 | 0.487 | 0.496 | 0.493 | 0.487 |
| $H_2$/HC, mole/mole | | 1.01 | 1.02 | 1.05 | 1.02 | 1.05 | 1.06 | 3.16 | 3.10 | 3.12 | 3.16 |
| Recovery, wt. percent | | 86.93 | 100.21 | 88.19 | 99.63 | 97.49 | 96.47 | 96.96 | 98.16 | 98.19 | 97.05 |

TABLE I—Continued

| | Feed | 145 1[1] | 145 2[1] | 149 1[1] | 149 2[1] | 146 1[1] | 146 2[1] | 147 1[1] | 147 2[1] | 150 1[1] | 150 2 |
|---|---|---|---|---|---|---|---|---|---|---|---|
| Gas yields: | | | | | | | | | | | |
| $H_2$, s.c.f./bbl | | 850.17 | 734.14 | 1,247.9 | 896.0 | 820.7 | 751.6 | 816.3 | 745.0 | 864.8 | 709.6 |
| $H_2$, wt. percent of charge | | 1.62 | 1.40 | 2.39 | 1.71 | 1.57 | 1.45 | 1.56 | 1.42 | 1.65 | 1.35 |
| $C_1$, wt. percent of charge | | 1.15 | 1.19 | 1.20 | 1.13 | 1.45 | 1.49 | 0.42 | 0.39 | 1.66 | 1.44 |
| $C_2$, wt. percent of charge | | 1.42 | 1.49 | 1.27 | 1.32 | 1.75 | 1.91 | 0.55 | 0.55 | 2.07 | 1.91 |
| $C_3$, wt. percent of charge | | 1.64 | 1.78 | 1.23 | 1.53 | 1.98 | 2.16 | 0.61 | 0.65 | 2.02 | 1.84 |
| $C_3^=$, wt. percent of charge | | | | | | | 0.44 | | | | |
| $nC_4$, wt. percent of charge | | 1.41 | 1.52 | 1.00 | 1.56 | | | 0.24 | | 1.89 | 1.70 |
| $iC_4^=$, wt. percent of charge | | 0.26 | 0.35 | 0.51 | 0.47 | 1.84 | 2.34 | | | 1.40 | 1.68 |
| $C_5$, wt. percent of charge | | 0.73 | 1.08 | 1.35 | 0.91 | 3.38 | 2.53 | | 0.65 | 2.53 | 3.40 |
| $C_5^=$, wt. percent of charge | | | | | | | | | | | |
| Coke yield, wt. percent of charge | | 2.16 | 2.18 | 2.70 | 2.71 | 2.26 | 2.26 | 0.63 | 0.62 | 2.57 | 2.60 |
| Liquid yields: | | | | | | | | | | | |
| $C_5+$, vol. percent of charge | 100.0 | 85.89 | 86.47 | 84.74 | 85.55 | 85.98 | 84.69 | 91.92 | 93.42 | 82.09 | 84.12 |
| $C_5+$, wt. percent of charge | 98.9 | 89.56 | 88.98 | 88.29 | 88.59 | 85.67 | 85.30 | 95.96 | 95.72 | 84.16 | 83.72 |
| $C_6+$, vol. percent of charge | 98.6 | 84.98 | 85.11 | 83.05 | 84.41 | 81.76 | 81.56 | 91.92 | 92.64 | 78.94 | 79.88 |
| Saturates, vol. percent of charge | 49.72 | 17.03 | 20.02 | 13.88 | 16.66 | 17.91 | 22.66 | 20.75 | 23.69 | 10.32 | 14.87 |
| Olefins, vol. percent of charge | 0.0 | 1.69 | 2.53 | 1.629 | 4.05 | 3.35 | 3.41 | 4.99 | 5.45 | 2.99 | 4.04 |
| $C_6$ aromatics, vol. percent of charge | 1.68 | 0.46 | 0.45 | 2.65 | 1.09 | 1.57 | 1.08 | 0.30 | 0.39 | 2.22 | 1.67 |
| $C_7$ aromatics, vol. percent of charge | 6.82 | 10.67 | 9.11 | 14.59 | 12.43 | 12.29 | 9.61 | 7.32 | 6.54 | 13.15 | 11.72 |
| $C_8$ aromatics, vol. percent of charge | 14.26 | 23.55 | 20.98 | 21.69 | 22.11 | 20.23 | 18.99 | 22.40 | 21.91 | 22.02 | 20.14 |
| $C_9$ aromatics, vol. percent of charge | 16.89 | 22.82 | 21.94 | 20.32 | 21.15 | 19.46 | 19.22 | 25.26 | 25.45 | 21.51 | 20.14 |
| $C_{10}$ aromatics, vol. percent of charge | 9.23 | 8.27 | 10.07 | 8.27 | 6.98 | 6.92 | 6.55 | 10.86 | 9.18 | 6.70 | 7.27 |
| Aromatics, vol. percent of charge | | 65.79 | 62.56 | 67.54 | 63.91 | 60.49 | 55.47 | 66.17 | 63.49 | 65.62 | 60.96 |
| Aromatics, vol. percent $C_5+$ | | 77.41 | 73.50 | 81.31 | 75.45 | 73.98 | 68.01 | 71.98 | 68.53 | 83.13 | 76.31 |
| Octane number, RON, clear | | 104.5 | 104.0 | 106 | 105 | 103.2 | 103 | 103.2 | 103 | 106.9 | 105 |
| Paraffin-cycloparaffin conversion, percent:[a] (Par.+CP Chg.−Par.−CP Rec.) 100/Par.+CP Chg | | 63.55 | 58.30 | 71.00 | 65.37 | 62.54 | 52.31 | 57.09 | 50.99 | 78.41 | 68.90 |
| Weight selectivities based on [a] par.-cyclopar. conv., percent: | | | | | | | | | | | |
| $H_2$ | | 6.00 | 5.62 | 7.86 | 6.13 | 5.87 | 6.53 | 6.39 | 6.53 | 4.93 | 4.60 |
| Aromatics | | 56.33 | 46.73 | 56.75 | 46.39 | 35.48 | 20.66 | 65.20 | 58.03 | 45.13 | 33.87 |
| $C_5+$ olefins | | 5.62 | 9.14 | 4.83 | 12.96 | 11.19 | 13.89 | 18.33 | 22.42 | 7.75 | 12.10 |
| $C_1$-$C_5$ HC | | 24.03 | 29.77 | 21.66 | 24.82 | 38.68 | 48.77 | 7.50 | 10.16 | 34.53 | 40.60 |
| Coke | | 7.99 | 8.72 | 8.89 | 9.69 | 8.46 | 10.13 | 2.57 | 2.85 | 7.65 | 8.80 |
| Par.-cyclopar. conversion, percent: [b] (Par.+CP Chg.−Par.−CP−Olef. Recov.) 100 Par.+CP charge | | 59.99 | 52.96 | 67.57 | 56.90 | 55.56 | 45.06 | 46.63 | 39.56 | 72.32 | 60.58 |
| Weight selectivities based on [b] conversions: | | | | | | | | | | | |
| $H_2$ | | 6.84 | 6.11 | 8.33 | 7.16 | 6.87 | 7.96 | 7.84 | 8.46 | 5.37 | 5.25 |
| Aromatics | | 59.40 | 51.49 | 59.60 | 53.24 | 39.85 | 23.90 | 79.83 | 74.78 | 48.92 | 38.54 |
| $C_1$-$C_5$ HC | | 25.34 | 32.80 | 22.74 | 28.48 | 43.78 | 56.42 | 9.18 | 13.09 | 37.42 | 46.20 |
| Coke | | 8.42 | 9.60 | 9.33 | 11.12 | 9.50 | 11.72 | 3.15 | 3.67 | 8.29 | 10.01 |
| C on catalyst, gm. C/100 gm. cat | | | 4.95 | | 6.23 | | 6.35 | | 1.51 | | 6.36 |
| Regeneration time, hr | | | 6.25 | | 7.5 | | 14.5 | | 1.75 | | 6.0 |
| Period length, hr | | 4 | 4 | 4 | 4 | 1 | 1 | 2 | 2 | 2 | 2 |

[1] Period number.
[a] $C_5+$ olefins considered as products.
[b] $C_5+$ olefins considered as reactants.

TABLE II

| | Pt/Al₂O₃ data A | Coordinated Pt/Al₂O₃-Cr₂O₃/Al₂O₃ processing and yield data | | | | | | | |
|---|---|---|---|---|---|---|---|---|---|
| | | 145-1 | 145-2 | 149-1 | 149-2 | 146-1 | 146-2 | 147-1 | 147-2 |
| Operating conditions: | | | | | | | | | |
| Temperature, °F | 900 | 1,029.7 | 1,031.8 | 951.3 | 950.0 | 902.9 | 901.9 | 903.6 | 902.5 |
| Pressure, p.s.i.g. | 350 | 5.0 | 5.0 | 5.0 | 5.0 | 6.0 | 6.0 | 20.0 | 20.0 |
| $H_2$/HC, mole/mole | 5 | 1.17 | 1.09 | 10.7 | 0.97 | 0.98 | 0.92 | 1.08 | 1.04 |
| LHSV, vol./vol | 2 | 0.442 | 0.468 | 0.483 | 0.502 | 0.262 | 0.281 | 0.473 | 0.494 |
| Yields: | | | | | | | | | |
| $H_2$, s.c.f./bbl | 771.4 | 1,750.2 | 1,496.8 | 1,565.4 | 1,438.3 | 1,472.3 | 1,391.5 | 1,144.6 | 1,129.4 |
| $C_1$, wt. percent of charge | 0.858 | 3.202 | 3.073 | 1.533 | 1.484 | 1.314 | 1.197 | 1.138 | 1.124 |
| $C_2$, wt. percent of charge | 1.528 | 4.076 | 3.976 | 2.348 | 2.291 | 2.072 | 1.893 | 1.902 | 1.899 |
| $C_3$, wt. percent of charge | 2.941 | 6.496 | 6.649 | 3.621 | 3.630 | 3.479 | 3.303 | 3.296 | 3.279 |
| $C_4$, wt. percent of charge | 1.360 | 4.948 | 4.680 | 2.260 | 2.164 | 1.639 | 1.573 | 1.917 | 1.969 |
| $C_5$, vol. percent of charge | 1.188 | 3.295 | 3.581 | 1.188 | 1.411 | 1.188 | 1.188 | 1.221 | 1.188 |
| $C_5+$, vol. percent of charge | 85.455 | 63.385 | 67.166 | 76.365 | 77.152 | 78.397 | 79.350 | 81.561 | 81.702 |
| $C_6+$, vol. percent of charge | 84.267 | 60.090 | 63.585 | 75.177 | 75.740 | 77.209 | 78.162 | 80.340 | 80.514 |
| Saturates, vol. percent of charge | 42.501 | 3.949 | 11.724 | 15.605 | 19.703 | 20.924 | 22.741 | 29.908 | 29.681 |
| Olefins, vol. percent of charge | | 1.167 | 1.873 | 4.299 | 3.040 | 3.095 | 3.641 | 3.197 | 3.201 |
| Aromatics: | | | | | | | | | |
| Vol. percent of charge | 41.766 | 54.916 | 49.987 | 55.273 | 52.456 | 53.189 | 51.779 | 47.233 | 47.631 |
| $C_6A$, vol. percent of charge | 1.434 | 5.435 | 1.745 | 0.648 | 0.598 | 0.170 | 0.374 | 0.351 | |
| $C_7A$, vol. percent of charge | 5.826 | 12.825 | 9.362 | 7.196 | 6.903 | 5.629 | 8.656 | 5.946 | 1.872 |
| $C_8A$, vol. percent of charge | 12.191 | 17.443 | 17.722 | 18.529 | 17.774 | 17.764 | 18.542 | 15.066 | 15.556 |
| $C_9A$, vol. percent of charge | 14.432 | 14.746 | 15.877 | 20.626 | 19.785 | 19.294 | 18.221 | 16.750 | 21.702 |
| $C_{10}A$, vol. percent of charge | 7.882 | 4.466 | 5.280 | 8.273 | 7.935 | 10.330 | 5.984 | 9.118 | 8.499 |
| Vol. percent aromatics in $C_5+$ | 48.875 | 86.639 | 74.423 | 72.380 | 67.991 | 67.845 | 65.253 | 57.910 | 58.298 |
| RON, Clear of $C_5+$[a] | 84.6 | 105.6 | 103.6 | 103.7 | 103.1 | 102.1 | 100.2 | 98.4 | 98.7 |
| Vol. percent aromatics in $C_6+$ | 49.573 | 91.39 | 78.61 | 73.520 | 69.258 | 68.889 | 66.24 | 58.79 | 59.159 |
| RON, clear of $C_6+$[b] | 84.7 | 107.1 | 105 | 104.1 | 103.5 | 102.5 | 100.5 | 98.7 | 99 |
| Octane-barrel, $C_5+$ | 72.29 | 66.93 | | 79.19 | | 80.04 | | 80.25 | |

TABLE II—Continued

| Identification | Coordinated Pt/Al₂O₃-Cr₂O₃/Al₂O₃ processing and yield data | | | | | | | | | | | |
|---|---|---|---|---|---|---|---|---|---|---|---|---|
| | 150-1 | 150-2 | 151-1 | 151-2 | 152-1 | 152-2 | 153-1 | 153-2 | 154-1 | 154-2 | 155-1 | 155-2 |
| Operating conditions: | | | | | | | | | | | | |
| Temperature, °F | 924.5 | 920.7 | 949.6 | 951.4 | 955.9 | 954.8 | 1,030.8 | 1,037.1 | 950.5 | 950.2 | 1,034.3 | 1,031.7 |
| Pressure, p.s.i.g. | 12.5 | 12.5 | 21.0 | 21.0 | 5.0 | 5.0 | 5.0 | 5.0 | 5.0 | 5.0 | 6.0 | 6.0 |
| H₂/HC, mole/mole | 1.13 | 1.02 | 1.01 | 1.02 | 1.05 | 1.02 | 1.05 | 1.06 | 3.16 | 3.10 | 3.12 | 3.16 |
| LHSV, vol./vol. | 0.340 | 0.377 | 0.254 | 0.252 | 0.245 | 0.252 | 0.975 | 0.966 | 0.487 | 0.496 | 0.493 | 0.487 |
| Yields: | | | | | | | | | | | | |
| H₂, s.c.f./bbl | 1,501.8 | 1,365.2 | 1,487.8 | 1,390.0 | 1,822.9 | 1,526.4 | 1,463.0 | 1,404.7 | 1,459.3 | 1,399.2 | 1,500.1 | 1,369.3 |
| C₁, wt. percent of charge | 1.369 | 1.317 | 1.877 | 1.913 | 1.920 | 1.860 | 2.141 | 2.172 | 1.202 | 1.202 | 2.324 | 2.126 |
| C₂, wt. percent of charge | 2.175 | 2.091 | 2.780 | 2.845 | 2.650 | 2.692 | 3.068 | 3.210 | 2.011 | 2.011 | 3.356 | 3.214 |
| C₃, wt. percent of charge | 3.576 | 3.599 | 4.386 | 4.509 | 4.026 | 4.285 | 4.688 | 5.231 | 3.517 | 3.517 | 4.724 | 4.566 |
| C₄, wt. percent of charge | 2.344 | 2.020 | 2.827 | 3.014 | 2.694 | 3.155 | 2.981 | 3.424 | 1.360 | 1.360 | 4.261 | 4.337 |
| C₅, vol. percent of charge | 1.709 | 1.411 | 1.960 | 2.327 | 2.610 | 2.333 | 4.744 | 4.315 | 1.843 | 1.843 | 3.844 | 4.760 |
| C₅+, vol. percent of charge | 77.540 | 78.578 | 73.570 | 74.091 | 72.594 | 73.536 | 73.638 | 73.041 | 79.301 | 79.907 | 70.362 | 72.072 |
| C₆+, vol. percent of charge | 75.831 | 77.167 | 71.610 | 71.764 | 69.985 | 71.203 | 68.894 | 68.726 | 77.458 | 78.064 | 66.518 | 67.312 |
| Saturates, vol. percent of charge | 18.778 | 22.393 | 14.750 | 16.871 | 11.700 | 14.046 | 15.095 | 19.100 | 17.488 | 19.967 | 8.699 | 12.532 |
| Olefins, vol. percent of charge | 2.257 | 3.086 | 1.423 | 2.133 | 1.372 | 3.411 | 2.829 | 2.880 | 4.210 | 4.594 | 2.521 | 3.406 |
| Aromatics: | | | | | | | | | | | | |
| Vol. percent of charge | 54.795 | 51.686 | 55.436 | 52.759 | 56.911 | 53.744 | 50.969 | 46.745 | 55.759 | 53.500 | 55.296 | 51.371 |
| C₆A, vol. percent of charge | 3.563 | 0.052 | 0.393 | 0.420 | 2.234 | 0.918 | 1.323 | 0.915 | 0.257 | 0.333 | 1.872 | 1.412 |
| C₇A, vol. percent of charge | 8.074 | 4.984 | 8.995 | 7.677 | 12.298 | 10.476 | 10.358 | 8.098 | 6.173 | 5.514 | 11.085 | 9.881 |
| C₈A, vol. percent of charge | 17.653 | 18.574 | 19.847 | 17.680 | 18.277 | 18.635 | 17.053 | 16.006 | 18.877 | 18.463 | 18.560 | 16.973 |
| C₉A, vol. percent of charge | 17.931 | 20.780 | 19.228 | 18.491 | 17.124 | 17.825 | 16.399 | 16.197 | 21.293 | 21.451 | 18.130 | 16.973 |
| C₁₀A, vol. percent of charge | 7.573 | 7.294 | 6.971 | 8.489 | 6.976 | 5.887 | 5.834 | 4.315 | 9.157 | 7.737 | 5.648 | 6.130 |
| Vol. percent of aromatics in C₅+ | 70.666 | 65.777 | 75.352 | 71.208 | 78.39 | 73.085 | 69.216 | 63.998 | 70.310 | 66.952 | 78.58 | 71.278 |
| RON, clear of C₅+ ª | 101.8 | 101.9 | 103.8 | 103.2 | 105.0 | 104.2 | 101.7 | 101.6 | 102.6 | 102.4 | 105.4 | 103.3 |
| Vol. percent aromatics in C₆+ | 72.259 | 66.97 | 77.414 | 73.517 | 81.319 | 75.48 | 73.98 | 68.016 | 71.980 | 68.530 | 83.129 | 76.319 |
| RON, clear of C₆+ ᵇ | 102.4 | 102.4 | 104.5 | 104 | 106.0 | 105 | 103.2 | 103 | 103.2 | 103.0 | 106.9 | 105 |
| Octane-barrel, C₅+ | 78.93 | | 76.36 | | 76.22 | | 74.88 | | 81.36 | | 74.16 | |

ª Calculated values for the coordinated process.
ᵇ Estimated values for period 2 from aromatics-octane plot from Period #1 data.

In the coordinated high pressure platinum and low pressure chromia catalyst phases of the process of this invention, RON values between 98.4 and 107.1 are obtained at $C_5+$ yields of 63.4 to 81.5. Hydrogen production in the chromia catalyst phase alone is from 375 to 1050 s.c.f. per barrel of charge. This hydrogen production is additive to the hydrogen yield from the high pressure platinum catalyst phase of this invention wherein hydrogen yield is enhanced by avoidance of hydrocracking of the higher boiling paraffins by not utilizing a third high pressure platinum catalyst phase reactor wherein there is little or no temperature drop. In the optimum operating range, for the coordinated process $C_5+$ yields of 81.5 and 78.4 were obtained at RON, clear, values of 98.4 and 102.1, respectively. In both cases the on-stream time was double the regeneration time, enabling two reactor cyclic operation. The $C_5+$ yield at the 98 RON, clear, level for the high pressure platinum-low pressure chromia system is estimated to be 6 percent higher than that obtained at the same octane number by reforming in a three reactor high pressure platinum catalyst system at 350 p.s.i.g. and 5/1 $H_2/HC$ ratio wherein hydrocracking is encouraged in the third high pressure platinum reactor. The two high pressure platinum reactor-one low pressure chromia reactor series system omitting a hydrocracking stage produces twice the hydrogen make of a three high pressure platinum reactor series system without a low pressure chromia phase because the hydrocracking (hydrogen-consuming) high pressure platinum catalyst phase is replaced by a dehydrocyclization (hydrogen-producing) low pressure chromia catalyst phase. Furthermore, the high pressure platinum-low pressure chromia coordinated system at a given product octane number contains about 2 percent less aromatics (indicating a higher volumetric yield for a given octane value because of the high density of aromatic compounds as compared to linear compounds) as compared to a high pressure platinum catalyst system alone.

In the coordinated high pressure platinum-low pressure chromia process the total volumetric yield loss is about 20 percent based on feed. Of this total loss, 15 percent is lost in the two reactor relatively high pressure platinum-alumina phase and only 5 percent in the single reactor relatively low pressure chromia-alumina phase. A good deal of the yield loss in the chromia phase was consumed by the increase in density of the aromatics formed as compared to their paraffin precursors and therefore the efficiency of the chromia phase under the mild conditions of the present invention is exceptionally high. In contrast, the 15 percent loss in the high pressure platinum catalyst phase is much greater that what could be expected from shrink age due to naphthene dehydroisomerization alone, indicating that some yield loss is attributable to undesired hydrocracking. In order to hold hydrocracking down to a low value in the high pressure platinum catalyst stage no attempt should be made to obtain more than 90 or 95 percent by volume conversion of feed naphthenes. The higher severity conditions required for higher naphthene conversions would fail to conserve adequate $C_9$ and $C_{10}$ paraffins for aromatization in the chromia phase. For best results at least 75 volume percent conversion of naphthenes to aromatics in the high pressure platinum catalyst phase is required.

The results of the tests of Tables I and II are further illustrated in FIGS. 1 and 2. FIG. 1 shows a graph (curve D) of the overall volumetric $C_5+$ yield of the combined high pressure plus low pressure catalyst phase process in relation to octane number. FIG. 1 also presents a graph (curve E) of the volume percent of aromatics in the $C_5+$ product in relation to octane number. At selected positions along curve D octane-barrel values are indicated and these values indicate that the maximum value of octane-barrel for the coordinated process is about 80.

FIG. 1 shows that the highest octane-barrel results occur close to the region of the yield-octane curve whereat sharp yield loss is incipient. Therefore, the process of the present invention, which is directed towards maximum octane-barrels, requires operation in the region of a precipitous drop in yield necessitating employing of mild conditions. The precipitous drop in yield occurs upon onset of appreciable cracking of heavy aromatics and paraffins, which are the most readily crackable materials present and which must be conserved in accordance with the present invention. It would be safer to operate the process under milder conditions and sacrifice octane value in favor of yield if low octane values could be overcome by addition of lead. However, in view of the present demand for unleaded gasoline the present process is directed towards the production of high octane unleaded gasoline.

Referring to FIG. 2, which is based on the data of Tables I and II, all of which was taken in the precipitous drop region of curve D of FIG. 1, i.e. at RON, clear, values of 98 to 107, the volume percent based on feed of each aromatic in the product of the chromia dehydrocyclization reactor is plotted against octane-barrel value for the combined high pressure-low pressure phase operation. FIG. 2 also indicates the quantity of each aromatic in the feed to the chromia phase. The octane-barrel value of the feed to the chromia phase is indicated by vertical line F. All values to the right of line F represent a net improvement in terms of octane-barrels for operation of the chromia phase. Vertical line G of FIG. 2 indicates the maximum octane-barrel value for the process.

The results shown in FIG. 2 are highly unusual. FIG. 2 shows that in relation to octane-barrel value the curves for $C_6$ and $C_7$ aromatics have an opposite slope from the curves for $C_9$ and $C_{10}$ aromatics, while the curve for $C_8$ aromatics is flat. FIG. 2 shows that chromia phase conditions which produce an increase in $C_6$ and $C_7$ aromatics also reduce octane-barrel values for the coordinated process. On the other hand, FIG. 2 shows that chromia phase conditions which produce an increase in $C_9$ and $C_{10}$ aromatics increase octane-barrel values of the coordinated process. The important showing of FIG. 2 is that an increase in $C_9$ and $C_{10}$ aromatics cannot accompany a significant increase in $C_6$ and $C_7$ aromatics and that any significant increase in $C_6$ and $C_7$ aromatics is achieved at a loss of octane-barrel values.

FIG. 2 shows that maximum octane-barrel value is achieved if the total and individual quantities of $C_9$ and $C_{10}$ aromatics are increased in the low pressure chromia dehydrocyclization phase, as compared to $C_9$ and $C_{10}$ aromatic content in the feed to the chromia phase, necessitating $C_9$ and $C_{10}$ paraffins (which are ordinarily hydrocracked because of their extremely low octane value) to be protected from hydrocracking in the high pressure platinum phase so that they can be preserved for inclusion in the feed to the chromia phase. A further important showing of FIG. 2 is that at maximum octane-barrels there is not only no net production of $C_6$ aromatics but also there is little or no net production of $C_7$ aromatics in the chromia phase.

FIG. 2 shows that an increase in the quantity of $C_9$ and $C_{10}$ aromatics in the chromia phase is incompatible with a high overall aromatics yield in the chromia phase because $C_9$ and $C_{10}$ aromatics can only be increased at the expense of no significant increase in $C_6$ and $C_7$ aromatics. In fact, Tables I and II show that for highest octane-barrel values no more than 50 or 55 percent conversion of paraffins to aromatics and other materials can occur in the chromia phase with very high octane-barrel values being achieved near 25 percent conversion. The shaded area of FIG. 2 is a region of net loss of $C_{10}$ aromatics in the chromia phase, indicating dealkylation of $C_{10}$ aromatics present in the feed. FIG. 2 shows that if the quantity of $C_{10}$ aromatics is decreased in the chromia phase, which occurs during appreciable production of $C_6$ and $C_7$ aromatics, the octane-barrel increase for the combined process is reduced or lost.

Figure 5:
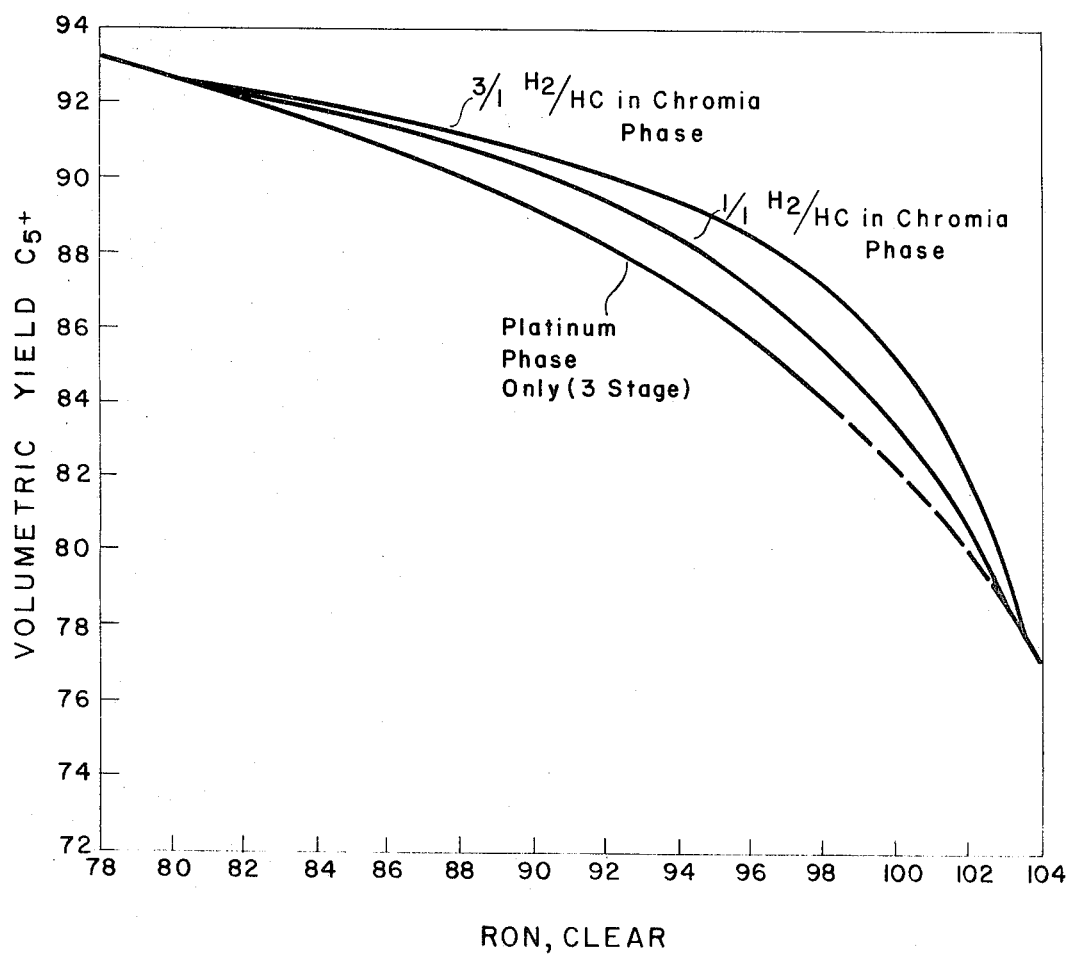

FIG. 5 illustrated the results of additional tests which were performed with a different feed to illustrate the advantageous effect of a relatively high mole ratio of hydrogen to hydrocarbon in the low pressure chromia phase. The lowest curve in FIG. 5 shows the generally optimized relationship of $C_5+$ yield to octane number in a three stage high pressure platinum phase reforming process, wherein hydrocracking and net hydrogen consumption occurs in the third high pressure stage and no chromia phase is employed. The middle curve shows the improvement achieved if the third stage of the high pressure platinum phase is omitted and a relatively low pressure chromia phase is substituted in its place and operated with a 1/1 hydrogen to hydrocarbon mole ratio. This mole ratio is achieved in the chromia phase by hydrogen recycle at the The top curve shows the same process as the middle curve except that a 3/1 hydrogen to hydrocarbon mole ratio is achieved in the chromia phase by hydrogen recycle at the chromia phase. By far the best results are achieved in the top curve at the 3/1 hydrogen to hydrogen mole ratio. FIG. 5 shows that for best results the hydrogen to hydrocarbon mole ratio in the chromia phase should be more than 1, generally, more than 2, preferably, and at least 3, most preferably. Since the chromia phase generates hydrogen, and since it replaces a platinum phase which consumes hydrogen, the high hydrogen ratio required in the chromia phase is readily available by recycle. Following are the data on which the curves of FIG. 5 are based.

| | | | | $Cr_2O_3$ phase yield | | | | | | | |
|---|---|---|---|---|---|---|---|---|---|---|---|
| | | | | Volume percent | | | | | | | |
| Temp., °F. | Pressure, p.s.i.g. | LHSV | $H_2$/HC, mole ratio | $C_5$ | $C_6+$ sat. | $C_6+$ olefins | Total aromatics | S.c.f./b. $H_2$ | Overall volume percent | Octane-barrel | RON, clear |
| 901.5 | 40 | .503 | 0.975 | 1.932 | 28.577 | .941 | 61.111 | 469 | 85.62 | 83.65 | 97.7 |
| 907.5 | 40 | 1.542 | 2.867 | | 36.866 | 4.353 | 55.63 | 321.8 | 39.53 | 84.42 | 94.3 |
| 979.6 | 40 | 1.275 | 1.156 | 1.479 | 15.252 | 2.595 | 65.757 | 763 | 78.812 | 80.309 | 101.9 |
| 980.9 | 10 | .483 | 1.016 | 2.680 | 7.052 | 1.208 | 71.538 | 1143 | 67.438 | 79.80 | 104.4 |
| 904.9 | 10 | .493 | 2.987 | .3569 | 21.331 | 4.628 | 66.615 | 777 | 85.96 | 85.78 | 99.8 |
| 977.0 | 12 | 1.49 | 2.962 | .374 | 21.918 | 3.509 | 65.554 | 771 | 84.517 | 84.85 | 100.4 |
| 977.1 | 40 | .483 | 3.05 | 1.811 | 11.538 | .839 | 70.112 | 676 | 78.098 | 81.22 | 104 |
| 911.3 | 10 | 1.46 | 1.011 | .321 | 31.239 | 5.752 | 58.378 | 404 | 88.39 | 83.53 | 94.5 |

The data discussed above show that in a single chromia low pressure dehydrocyclization zone production of a significant qauntity of $C_6$ and $C_7$ aromatics is incompatible with high octane-barrel values. In a variation of this process, the operation is performed so that $C_6$ and $C_7$ paraffins are also dehydroaromatized to aromatics by fractionating the high pressure platinum catalyst phase effluent and charging the $C_6$ and $C_7$ paraffins, with or without $C_8$ paraffins, and their corresponding aromatics to a chromia catalyst phase phase operating under a relatively high severity for dehydrocyclization but at a much lower pressure than the high pressure platinum phase to dehydroaromatize the $C_6$, $C_7$ and $C_8$ paraffins, while the $C_9$ and $C_{10}$ paraffins and naphthenes together with $C_9$ and $C_{10}$ aromatics are charged together with the effluent from the $C_6$–$C_8$ reactor to a separate chromia catalyst phase operated under relatively mort mild conditions including a lower pressure.

In one embodiment of this variation, the total effluent from the second stage of the high pressure platinum catalyst phase is fractionated and the $C_6$ and $C_7$ paraffins, with or without $C_8$ paraffins, and their corresponding aromatics are charged to the top of a single low pressure chromia catalyst reactor while the $C_9$ and $C_{10}$ paraffins together with $C_9$ and $C_{10}$ aromatics are separately charged to an intermediate position downstream in the low pressure chromia catalyst zone. Relatively high severity dehydrocyclization conditions can be employed upstream from the point of introduction of $C_9$ and $C_{10}$ paraffins but starting at the position of introduction of $C_9$ and $C_{10}$ paraffins and downstream therefrom reaction conditions are sufficiently mild so that while there is a net increase in both $C_9$ and $C_{10}$ aromatics in the downstream zone there is little or no further conversion in the same downstream catalyst zone of $C_6$ and $C_7$ paraffins to aromatics. This dual severity zone arrangement in a single reactor advantageously permits the reaction of $C_9$ and $C_{10}$ aromatics to be enhanced by not only the presence of all aromatics produced in the high pressure platinum catalyst phase but also by the presence of $C_6$, $C_7$ and $C_8$ aromatics produced in the upstream region of the chromia catalyst reactor.

Figure 3:
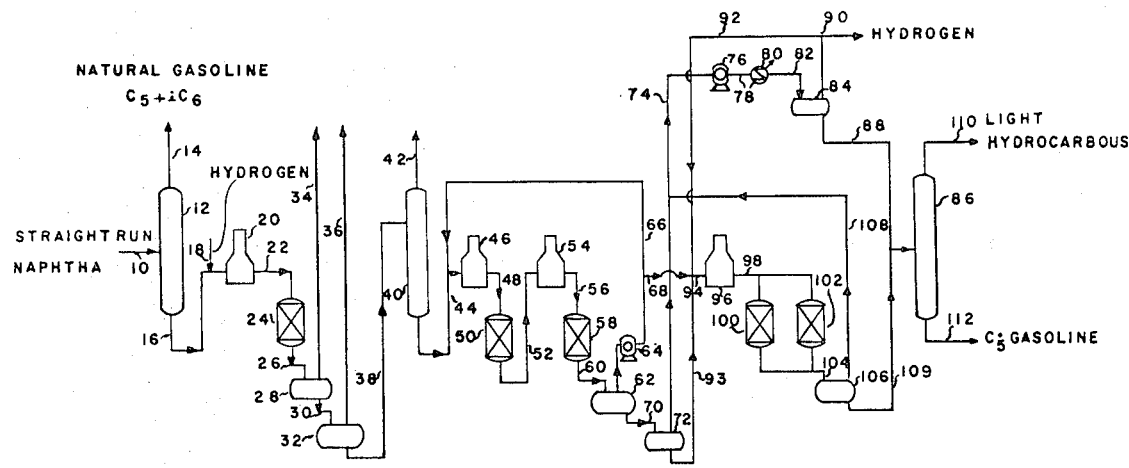

A schematic view of the process of the invention is illustrated in FIG. 3. As shown in FIG. 3, straight run naphtha is charged to the process through line 10 to fractionator 12 from which nonaromatizable $C_5$ and iso-$C_6$ hydrocarbon (known as natural gasoline) is withdrawn overhead through line 14 while aromatizable linear paraffins and naphthenes (commonly five carbon-member ring structures) are removed as bottoms through line 16. The gasoline range bottoms stream is mixed with hydrogen charged through line 18 and passed through gas-fired furnace 20 from which it flows through line 22 to catalytic pretreater unit 24 wherein sulfur and nitrogen are removed since these materials poison the high pressure platinum catalyst. Effluent from catalytic unit 24 passes through line 26 to a first flash separator 28 and thence through line 30 to a second flash separator 32 which separators discharge hydrogen, hydrogen sulfide, ammonia, methane, etc. though lines 34 and 36. Thereupon, liquid gasoline is passed through line 38 to stripper 40 which removes any residual sulfide, ammonia and light hydrocarbon gases through line 42.

Purified $C_6^+$ gasoline passes through line 44 where it receives recycle hydrogen through line 66 and then passes through furnace 46 and line 48 in transit to first high pressure platinum phase reactor 50. Reactor 50 contains platinum-aluminum-chloride catalyst in a fixed bed and is operated at 900 to 950° F. (inlet), 250 to 400 p.s.i.g., 2–6 LHSV nad a 2 to 7 $H_2/HC$ mole ratio. The temperature drop in reactor 50 is about 120° F. and the reaction is primarily the dehydrogenation and dehydroisomerization of feed naphthenes to aromatics, Cool effluent passes through line 52, furnace 54 and line 56 in transit to a second high pressure platinum catalyst reactor 58. Reactor 58 contains a fixed bed of platinum catalyst of the same composition and operates under the same conditions as reactor 50 except that the temperature drop is only 60° F. because most of the feed naphthenes were converted in reactor 50. At the exit of reactor 58 about 90 to 95 percent conversion of feed naphthenes is achieved as well as the achievement of equilibrium isomerization of paraffins.

If complete conversion of naphthenes to aromatics, dehydroaromatizing of linear paraffins or hydrocracking were desired, reheating followed by a third high pressure fixed bed platinum reactor would be required. However, a third high pressure reactor is avoided in accordance with the present invention and the aromatics-containing linear paraffins effluent is prepared for the relatively low pressure chromia phase by passage through line 60 to high pressure hydrogen separator 62 from which hydrogen is recycled through compressor 64 and line 66. Some hydrogen is passed to the chromia phase through line 68. The gasoline range bottoms stream is then passed through line 70 and light gas and low pressure hydrogen separator 72 from which separated gases pass through line 74 to compressor 76, line 78, cooler 80, line 82 and separator 84. Condensed $C_5$ and $C_6$ hydrocarbons are passed to product fractionator 86 through 88 while hydrogen containing light gases are partially withdrawn from the process through line 90 and partially recycled to the chromia phase through line 92.

Liquid product from separator 72 is passed through line 93 and is combined with the hydrogen stream in line 92 and passes through line 94, heater 96 and line 98 to either of low pressure fixed bed chromia reactors 100 or 102. One of the chromia reactors is continuously onstream while the other is being regenerated by burning of carbon deposits with air. In order to prevent loss of dehydrocyclization activity in the chromia catalyst, frequent reactivation by burning of coke deposits in air is required. Catalyst cycles generally are about 24 hours. The chromia reactors contain a $Cr_2O_3/Al_2O_3$ catalyst promoted with sodium in a fixed bed. They can operate at a 900 to 1030° F. inlet temperature, 5 to 100 p.s.i.g., 0.5 to 2 LHSV and a 1/1 to 4/1 $H_2/HC$ mole ratio. The temperature drop is above 100° F. The primary reactions are dehydroaromatization of linear paraffins to aromatics and dehydrogenation of paraffins to olefins. The chromia reactor effluent is removed through line 104 and passes through separator 106 which removes hydrogen and passes it through line 108 to line 74 and compressor 76. The liquid product from separator 106 is passed through line 109 to product fractionator 86 from which light hydrocarbons are removed overhead through line 110 and $C_5^+$ gasoline product is recovered through line 112.

Figure 4:
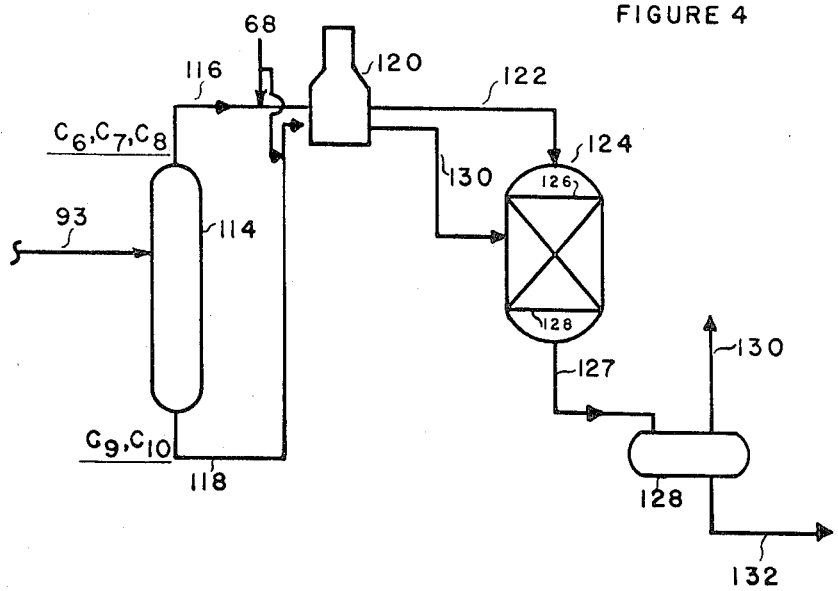
Figure 8:
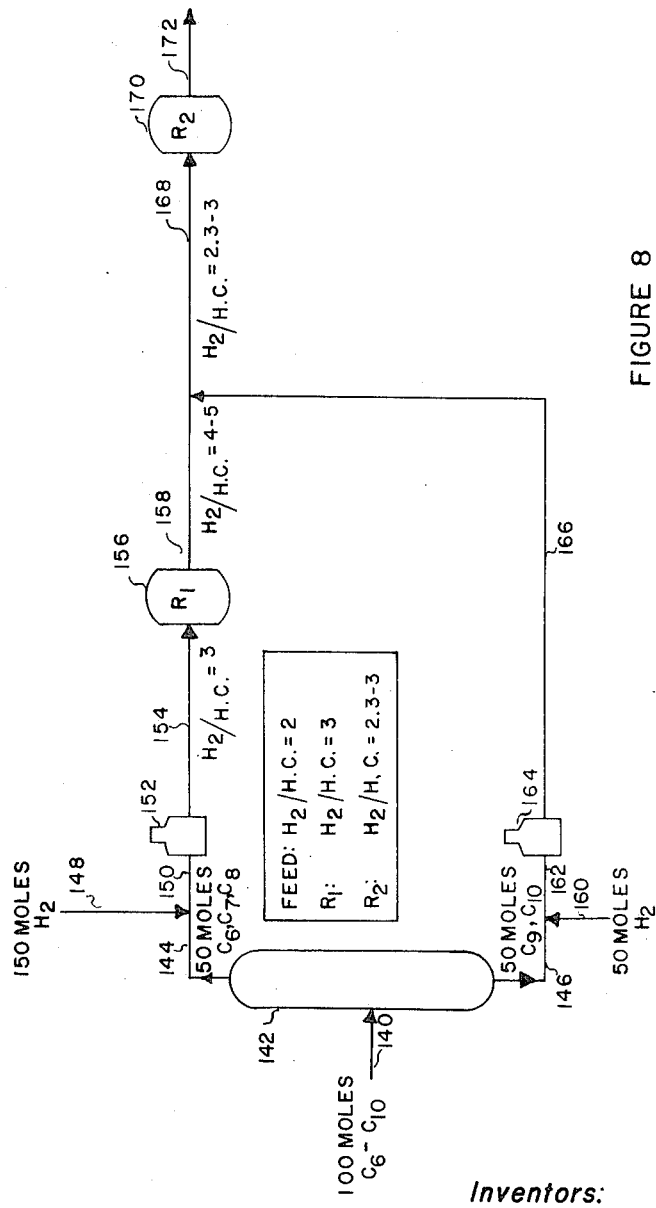

The split feed chromia phase reactor embodiment is illustrated in FIG. 4. As shown in FIG. 4, the gasoline range effluent from the relatively high pressure platinum catalyst phase flowing through line 93, shown in FIG. 3, is charged to a fractionator 114 from which $C_6$, $C_7$ and $C_8$ paraffins and aromatics are removed overhead through line 116 and $C_9$ and $C_{10}$ paraffins and aromatics are removed as bottoms through line 118. The light and heavy streams are independently passed through heater 120 after being mixed with hydrogen from line 68, shown in FIG. 3. More than half of the hydrogen in line 68 is charged to light fraction line 116. The heated light fraction at an inlet temperature of 975° F. or higher passes through line 122 to the top of chromia reactor 124 and is dehydroaromatized in upstream catalyst zone 126 while the heated heavy fraction passes through line 130 to reactor 124 and is dehydroaromatized in downstream catalyst zone 128. The temperature at the mixing point is about 920 to 950° F. Catalyst zone 128 is preferably larger than zone 126. If desired, catalyst zones 126 and 128 can be disposed in separate reactors in series, as illustrated in FIG. 8. The effluent from reactor 124 passes through line 127 to separator 128 from which hydrogen is removed through line 130 and can be recycled and gasoline range product is sent to a product stabilizer through line 132.

FIG. 5 illustrated the advantage of high hydrogen to hydrocarbon ratios in the chromia phase. FIG. 8 shows how the split feed method of operating the chromia phase can be used to actually increase the ratio of hydrogen to hydrocarbon in the feed to each low pressure chromia phase above the overall feed ratio of hydrogen to hydrocarbon. As shown in FIG. 8, 100 moles of $C_6$ to $C_{10}$ linear paraffinic and aromatic hydrocarbon from the second high pressure platinum stage are charged through line 140 to fractionator 142 from which 50 moles of $C_6$, $C_7$ and $C_8$ hydrocarbon are discharged overhead through line 144 and 50 moles of $C_9$ and $C_{10}$ hydrocarbon are withdrawn through bottoms line 146. 150 moles of hydrogen are charged through line 148 to line 144 and the mixed stream passes through line 150, furnace 152, line 154 and first chromia reactor 156. As indicated in FIG. 8, the feed hydrogen to hydrocarbon mole ratio to the first reactor 156 is 3, while the discharge ratio from reactor 156 in line 158 is four to five because of hydrogen make in reactor 156.

To the 50 moles of hydrocarbon in the bottoms stream in line 146 is introduced 50 moles of hydrogen through line 160 and the combined stream passes through line 162, furnace 164, line 166, and finally admixes with the effluent from reactor 156 in line 158. The hydrogen to hydrocarbon ratio in the combined stream of line 168 is about 2.3 to 3 and this stream is introduced to the second chromia catalyst reactor 170. The product of the process is discharged through line 172.

It is apparent from FIG. 8 that the dehydrocyclization of $C_6$, $C_7$ and $C_8$ materials occurs primarily in reactor 156 while the dehydrocyclization of $C_9$ and $C_{10}$ materials occurs primarily in reactor 170. FIG. 8 shows that the overall feed ratio of hydrogen to hydrocarbon to the combined reactors is only 2. However, the ratio in each reactor is considerably higher, i.e. the ratio in reactor 156 is 3 while the ratio in reactor 170 is 2.3 to 3. Therefore, the series chromia reactor system utilizing a split hydrocarbon feed and split hydrogen feed as shown in FIG. 8 permits the hydrogen to hydrocarbon ratio in each reactor to be higher than the feed ratio. In this manner, the system of FIG. 8 obtains an enhanced effect from the advantage of high ratios of hydrogen to hydrocarbon as illustrated in FIG. 5.

A further advantage of the dehydrocyclization system of FIG. 8 is that the separate reactors permit the selective use of different temperatures for the dehydrocyclization of different species. Therefore, first reactor 156 can operate at a higher temperature than second reactor 170, permitting higher temperatures for the dehydrocyclization of the more refractory $C_6$, $C_7$ and $C_8$ materials than for the easily crackable $C_9$ and $C_{10}$ materials. Furthermore, the system of FIG. 8 permits the hydrogen make and other effluent from first reactor 156 to be directly available for the dehydrocyclization of $C_9$ and $C_{10}$ materials in second reactor 170 without any intermediate reactor or other unit. Finally, introduction of hot hydrogen and hydrocarbons through line 166 to the effluent of the first reactor in line 158 permits interstage heat to be introduced to the system without the use of an interstage heater or any other interstage unit. An interstage heater or other unit would be disadvantageous because it necessarily involves an additional pressure drop which in turn would increase the presure level in the first reactor. This is particularly undesirable because aromatic yields decrease with increasing pressure. All of these advantages tend to advantageously move the upper solid curve of FIG. 6 to the right so that higher octane numbers can be achieved at any octane-barrel value with the system of FIG. 8 as compared to a single chromia phase system without a split feed.

FIG. 9 illustrates the significance of various operating variables in a low pressure dehydrocyclization chromia phase. In obtaining the data for each curve of FIG. 9, a $C_5^+$ 82 RON, Clear, reformate from a 2-stage relatively high pressure platinum catalyst reformer was fed to the top of a single chromia reactor. The inverted triangle data points of curve N relate research octane number, clear, to octane-barrels for operation in the chromia phase at a temperature of 900° F., a pressure of 40 p.s.i.g. and a hydrogen to hydrocarbon ratio of 1. Curve O shows that when the temperature was raised to 975° F., the yield octane-barrel value decreased, indicating hydrocracking is more temperature responsive than dehydrocyclization. However, the solid circle data points of curve N show that raising the hydrogen to hydrocarbon ratio is raised from 1 to 3 at 975° F. a considerable im-temperature. On the other hand, although curve O produced inferior results at 975° F., compared to curve N, curve M shows that when the hydrogen to hydrocarbon ratio is raised from 1 to 4 at 975° F. a considerable improvement in yield octane-barrel value is achieved. Therefore, high hydrogen level is significantly beneficial only at high temperature. To achieve an advantage from hydrogen recycle in the chromia phase (to increase hydrogen to hydrocarbon ratio in the feed to the chromia phase above the autogenous ratio delivered by the high pressure platinum phase), the temperature should be above 900° F., and preferably should be greater than 920°, 940° or 950° F. Finally, in comparing curve P with curve M, the only difference between curves P and M being that curve P represents data taken at 80 p.s.i.g. rather than 40 p.s.i.g., it is seen that the most inferior results of all the tests taken occurred at 80 p.s.i.g. Therefore, it is highly critical to the present invention that pressures in the chromia phase be as low as possible to encourage the dehydrocyclization reaction in preference to non-aromatization reactions. Additional data presented below show that the lowest pressures in the dehydrocyclization range selectively favor $C_9^+$ paraffin aromatization over $C_6$ and $C_7$ paraffin aromatization.

FIGS. 10A and 10B represent tests taken to illustrate the favorable effect upon net aromatics production in the low pressure chromia phase which occurs when the $C_9$ and $C_{10}$ aromatics produced in the high pressure platinum catalyst phase are introduced into the chromia phase together with the $C_9$ and $C_{10}$ paraffins which are to be dehydrocyclized. The data illustrated by the curves of FIGS. 10A and 10B, especially FIG. 10B, show that inclusion of a $C_9$ aromatic with a $C_9$ linear paraffin in the feed to the chromia phase increases further production of $C_9$ aromatics. The effluent from the second high pressure platinum catalyst reactor normally contains about 50 percent aromatics. Comparative tests were made to illustrate results in the chromia phase with a feed comprising 100 percent normal nonane (curve S of FIGS. 10A and 10B) and with a separate feed comprising equal amounts by volume of normal nonane and a $C_9$ aromatics, 1,2,4-trimethyl benzene (curve T or FIGS. 10A and 10B). The chromia phase in all tests was operated at a temperature of 950° F., a pressure of 40 p.s.i.g. and a hydrogen to hydrocarbon ratio of 1.

The curves of FIG. 10A show that inclusion in the feed of the $C_9$ aromatic, 1,2,4-trimethyl benzene, increased total conversion of normal nonane in the chromia phase from about 79 to 87 weight percent at a space-time of 2. Therefore, the introduction of the aromatic increased conversion of n-nonane about 10 percent, which is a considerable increase, indicating that product aromatic exerts an autocatalytic effect on the conversion of $C_9$ linear paraffin feed in the chromia phase. The importance of this increase in conversion to the present invention is illustrated in FIG. 10B which shows that at the same space time, the weight selectively to aromatics production increased about 1.7 percent. FIG. 10B shows that at a lower space time, a much greater effect upon selectivity to aromatics production is achieved.

FIGS. 10A and 10B show that the inclusion of a $C_9$ aromatic with a $C_9$ linear paraffin in the feed to a chromia dehydrocyclization phase of the present invention tends to increase total conversion of $C_9$ paraffin in the chromia phase even though $C_9$ aromatic is a product material, and by regulating the space-time of the process a high proportion of the increased conversion can be recovered as $C_9$ aromatic.

The following data encompass a more complete tabulation of the yields obtained in the tests represented in FIGS. 10A and 10B.

| | Gram catalyst-hour/gram feed | Paraffin (n-$C_9$) conversion, weight percent | Aromatic selectivity; gram aromatic/ gram paraffin | Hydrogen selectivity, weight | $C_1$-$C_5$ selectivity, weight | $C_5^+$ paraffin selectivity, weight | Olefin selectivity, weight | Coke selectivity, weight |
|---|---|---|---|---|---|---|---|---|
| Curve: | | | | | | | | |
| S | 2.073 | 79.03 | 61.358 | 4.549 | 20.374 | 7.463 | 5.565 | .687 |
| S | 1.036 | 60.153 | 62.096 | 4.98 | 15.822 | 5.454 | 10.926 | .716 |
| T | 1.968 | 86.67 | 63.032 | 4.199 | 19.894 | 7.764 | 2.586 | 2.518 |
| T | .984 | 64.024 | 65.577 | 4.61 | 16.488 | 5.405 | 6.348 | 1.556 |

It is preferable that the aromatics in the feed to the chromia phase be devoid of 3 or 4 carbon number alkyl substituents, such as propyl or butyl, since such aromatics are unstable and tend to heavy coke formation at the low hydrogen pressures in the chromia phase. It is an important advantage of the present invention that the $C_9$ and $C_{10}$ aromatics produced in the high pressure platinum phase are produced under isomerization conditions so that they tend to contain multiple small alkyl groups, mostly multiple methyl groups, with some ethyl groups, rather than a single propyl or butyl group. If the $C_9$ and $C_{10}$ aromatics in the feed to the chromia dehydrocyclization phase possessed propyl or butyl groups they would be unstable and readily dealkylate and form coke in the chormia phase. In a test where the feed to the chromia phase comprised normal butyl benzene together with normal decane, coking was so severe that the system was inoperative. In contrast, as shown in the above data, 1,2,4-trimethylbenzene proved to be highly refractory in the chromia phase.

It is unexpected that an improved $C_9$ and $C_{10}$ dehydrocyclization process is achieved by inclusion of $C_9$ and $C_{10}$ aromatics with the $C_9$ and $C_{10}$ linear paraffin feed to a chromia dehydrocyclization phase because chromia is known to be effective as a dealkylation catalyst. Therefore, it would be expected that net $C_9$ and $C_{10}$ dealkylation would occur, rather than net $C_9$ and $C_{10}$ production. In fact, the shaded area of FIG. 2 shows that net $C_{10}$ dealkylation does occur easily and should be avoided, if possible. A surprising feature of the present invention is that when $C_9$ and $C_{10}$ aromatics are included with the $C_9$ and $C_{10}$ linear paraffin feed to the chromia phase there is not only a net production rather than a net loss of $C_9$ and $C_{10}$ aromatics in the chromia phase but the net production of $C_9$ and $C_{10}$ aromatics is actually enhanced. For best results, the feed to the chromia phase should contain at least 10 to 60 percent aromatics by volume based on total feed.

FIGS. 10A and 10B show that inclusion of the $C_9$ aromatic in the n-nonane feed both greatly enhances n-nonane conversion and also enhances aromatic selectivity. These effects can only occur under dehydrocyclization conditions sufficiently mild to avoid significant dealkylation of feed and product $C_9$ aromatics. Because the inclusion of $C_9$ aromatics in the feed permits high yields of n-nonane without resorting to high severity conditions, use of the feed $C_9$ aromatic permits avoidance of high severity conditions at which significant conversion of $C_6$ and $C_7$ paraffins to corresponding aromatics can occur. It is seen that any $C_9$ or $C_{10}$ aromatic which is present in the feed not only encourages production of $C_9$ and $C_{10}$ aromatics, which are octane-barrel enhancers, but because the feed aromatic can promote high yields $C_9$ and $C_{10}$ aromatics without resorting to high severity conditions it permits avoidance of conditions sufficiently severe for the significant conversion of $C_6$ and $C_7$ paraffins to $C_6$ and $C_7$ aromatics, which are octane-barrel depressants. The advantageous effect upon product octane-barrel value achieved by inclusion of $C_9$ aromatics in the feed is therefore two-pronged. However, in order to achieve this two-pronged effect it is necessary to avoid high severity conditions, i.e. conditions conducive to significant dealkylation of $C_9$ or $C_{10}$ aromatics or conditions conducive to producing an excessive ratio of $C_6$ and $C_7$ aromatics to $C_9$ and $C_{10}$ aromatics. Sufficiently mild conditions obtain when the dehydrocyclization product octane-barrel value is greater than the feed octane-barrel value, preferably greater by at least 2 or 3 or even 5 points.

As explained above, the dehydocyclization phase is operated at a pressure lower than the pressure in the naphthene aromatization phase. It is shown below that as the pressure in the dehydrocyclization phase is diminished to very low levels in the dehydrocyclization range selectivity to $C_9$ and $C_{10}$ aromatization is favored over $C_6$ and $C_7$ aromatization, thereby increasing octane-barrel values for the process. This feature is illustrated by the following data based upon four tests in a chromia-alumina dehydrocyclization phase to which an 82 RON gasoline was fed from a platinum catalyst naphthene aromatization phase operated at 400 p.s.i.g.

| | DHC feed | DHCproduct | | | |
|---|---|---|---|---|---|
| | | Test 1 | Test 2 | Test 3 | Test 4 |
| Temperature, °F. | | 975 | 975 | 975 | 975 |
| $H_2/HC$ | | 3.0 | 3.0 | 3.0 | 3.0 |
| LHSV | | 1.5 | 1.5 | 0.97 | 0.97 |
| Pressure (p.s.i.g.) | | 40 | 80 | 40 | 80 |
| Volume percent based on naphtha charge to platinum phase: | | | | | |
| Total aromatics | 45.15 | 59.04 | 54.52 | 61.16 | 56.33 |
| Benzene | .4197 | .5266 | .772 | .635 | .9207 |
| Toluene | 7.406 | 7.967 | 9.26 | 8.67 | 9.96 |
| $C_8$ aromatics | 14.707 | 18.43 | 18.51 | 19.25 | 19.33 |
| $C_9^+$ aromatics | 22.573 | 32.11 | 25.98 | 32.6 | 26.122 |
| $C_5^+$ yield | 93.3 | 86.07 | 85.5 | 84.38 | 83.56 |
| RON, clear | 82.4 | 98.55 | 96.9 | 99.36 | 97.88 |
| Octane-barrel | 76.88 | 84.83 | 82.87 | 83.84 | 81.79 |

Tests 1 and 2 and tests 3 and 4 of the above table are paired according to space velocity. Test 2 differs from test 1 only by the use of a higher pressure. At the higher pressure of test 2, benzene and toluene production was higher than at the lower pressure of test 1, but $C_9^+$ aromatics production and octane-barrel value was lower. $C_8$ aromatics production was neutral to the effect of pressure. Similarly, test 4 differs from test 3 only by the use of a higher pressure. Again, at the higher pressure of test 4, benzene and toluene production was higher than at the lower pressure of test 3, but $C_9^+$ aromatics production and octane-barrel value were lower, while $C_8$ aromatics production was neutral to the effect of pressure. The data of the above table clearly show that to obtain the full advantage of the present invention, it is not only necessary for the pressure in the chromia phase to be in the dehydrocyclization range but also that the pressure should be in a relatively low region of the dehydrocyclization range at which relative production of $C_9^+$ aromatics is favored over $C_6$ and $C_7$ aromatics. The pressure must be sufficiently high for te dehydrocyclization reaction to proceed, but sufficiently low that an improvement in octane-barrel results.

Additional tests were performed to illustrate the advantage of the dehydrocyclization pressure range of this invention in terms of octane-barrel improvement when employing a dehydrocyclization catalyst comprising 0.375 weight percent platinum, 0.9 weight percent chlorine and 0.25 weight percent germanium on alumina. The feed to the dehydrocyclization phase was 82.6 RON naphtha from an acid platinum catalyst naphthene aromatization phase operated at 400 p.s.i.g. The results of the dehydrocyclization tests are presented in the following table.

| Test | Temperature (°F.) | LHSV | Pressure (p.s.i.g.) | $C_5^+$ yield [1] | RON, clear | Octane-barrel |
|---|---|---|---|---|---|---|
| 1 | 900 | 1.47 | 150 | 85.07 | 101.4 | 86.26 |
| 2 | 900 | 1.55 | 250 | 86.03 | 96.58 | 83.09 |
| 3 | 915 | 1.45 | 150 | 81.90 | 103.75 | 84.97 |
| 4 | 915 | 1.55 | 250 | 83.28 | 100.94 | 84.06 |
| 5 | 925 | 1.69 | 150 | 81.41 | 104.22 | 84.84 |
| 6 | 925 | 1.5ʋ | 250 | 82.2 | 101.90 | 83.76 |

[1] Volume percent based on naphtha charge to first phase.

In the above table, tests 1 and 2, 3 and 4, and 5 and 6 are paired according to temperature. In each pair of tests, one test was operated at a relatively high pressure (above the dehydrocyclization range of the invention) and the other at a relatively low pressure (within the dehydrocyclization range of the invention). In each pair of tests, the test performed at the lower pressure produced the highest octane-barrel value. The above table shows that when a platinum dehydrocyclization catalyst is employed, operation in the pressure range of this invention results in highest octane-barrel values.

In an extension of the above tests, the high pressure first platinum phase was tested at 250 p.s.i. instead of 400 p.s.i. and naphthene aromatization was accompished to nearly the same extent as at 400 p.s.i. However, at 250 p.s.i. the extent of carbon formation on the catalyst is greater than at 400 p.s.i. Therefore, although the platinum high pressure phase can operate at pressures as low as 225, pressures above 250 or 300 p.s.i. are advantageous in lengthening catalyst cycle life for the high pressure phase. In this manner, frequent catalyst regenerations are required for the dehydrocyclization phase only of this invention, in which phase catalyst cycles are about one to three days. In contrast, catalyst cycles for the high pressure phase can extend to six months by using the recommended high pressures.

We claim:

1. A process for reforming a gasoline range feed containing $C_9$ and $C_{10}$ naphthenes and paraffins without significant hydrocracking of $C_9$ and $C_{10}$ paraffins and in which all naphthene aromatization occurs in a first phase and under a combination of process conditions such that no further naphthene aromatization occurs in a second phase while substantially all paraffin aromatization occurs in said second phase comprising passing said feed through an acidic platinum-group catalyst phase at a pressure in the range of about 225 to 700 p.s.i. to dehydroisomerize said $C_9$ and $C_{10}$ naphthenes to aromatics, passing the effluent from the acidic platinum-group catalyst phase which effluent contains said aromatics together with said $C_9$ and $C_{10}$ paraffins through a dehydrocyclization catalyst phase at a pressure below 200 p.s.i. to dehydrocyclize said $C_9$ and $C_{10}$ paraffins to aromatics, said combination of process conditions being such that the effluent from said dehydrocyclization catalyst contains an increased quantity of $C_9$ and $C_{10}$ aromatics as compared to the effluent from said acidic platinum-group catalyst phase.

2. The process of claim 1 wherein the dehydrocyclization catalyst comprises chromia or molybdena.

3. The process of claim 1 wherein said acidic platinum-group catalyst comprises platinum.

4. The process of claim 1 wherein 75 to 95 percent of the naphthenes are aromatized in the acidic platinum-group catalyst phase.

5. The process of claim 1 wherein the temperature drops across each reactor of said acidic platinum-group catalyst phase and said dehydrocyclization catalyst phase.

6. The process of claim 1 wherein said gasoline range feed is a straight run or cracked naphtha.

7. The process of claim 1 wherein said gasoline range feed contains 5 to 20 percent aromatics, 20 to 70 percent paraffins, with the remainder being naphthenes.

8. The process of claim 1 wherein the dehydrocyclization catalyst comprises platinum and the dehydrocyclization phase pressure is less than 175 p.s.i.

9. The process of claim 1 wherein the $C_9$ and $C_{10}$ paraffins are substantially undiminished by hydrocracking in the acidic platinum-group catalyst phase.

10. The process of claim 1 wherein the conditions in the dehydrocyclization catalyst phase substantially avoid dealkylation of $C_{10}$ aromatics.

11. A process for reforming a gasoline range feed containing $C_9$ naphthenes and paraffins without significant hydrocracking of $C_9$ paraffins and in which all naphthene aromatization occurs in a first phase and under a combination of process conditions such that no further naphthene aromatization occurs in a second phase while substantially all paraffin aromatization occurs in said second phase comprising passing said feed through an acidic platinum-group catalyst phase at a pressure in the range 225 to 700 p.s.i. to dehydroisomerize said $C_9$ naphthenes to $C_9$ aromatics, passing the effluent from said acidic platinum-group catalyst phase which effluent contains said $C_9$ aromatics together with said $C_9$ paraffins through a dehydrocyclization catalyst phase at a pressure below 200 p.s.i. to dehydrocyclize said $C_9$ paraffins to aromatics, said combination of process combinations being such that the effluent from said dehydrocyclization catalyst phase contains an increased quantity of $C_9$ aromatics as compared to the effluent from said acidic platinum-group catalyst phase.

12. The process of claim 11 wherein the dehydrocyclization catalyst phase pressure is less than 50 p.s.i.

13. The process of claim 11 wherein the dehydrocyclization catalyst phase pressure is less than 25 p.s.i.

14. The process of claim 11 wherein said acidic platinum-group catalyst comprises platinum.

15. The process of claim 11 wherein the dehydrocyclization catalyst is chromia and the pressure in the dehydrocyclization catalyst phase is less than 100 p.s.i.

16. The process of claim 11 wherein the dehydrocyclization catalyst is platinum and the pressure in the dehydrocyclization phase is less than 175 p.s.i.

17. The process of claim 11 wherein the dehydrocyclization catalyst phase the inlet temperature is 950 to 1000° F. and the hydrogen to hydrocarbon mole ratio is 2 or higher.

References Cited

UNITED STATES PATENTS

| | | | |
|---|---|---|---|
| 3,660,271 | 5/1972 | Keith et al. | 208—65 |

FOREIGN PATENTS

| | | | |
|---|---|---|---|
| 626,717 | 9/1961 | Canada | 208—65 |
| 626,777 | 9/1961 | Canada | 208—65 |
| 607,754 | 11/1960 | Canada | 208—65 |

OTHER REFERENCES

Catalysis, volume IV, Paul H. Emmett, ed. Reinhold Publishing Co., New York, 1956, QD 501 E58, pp. 542–543.

The Chemistry of Petroleum Hydrocarbons, vol. II, Reinhold Publishing Co., New York, 1955, QD 305 H5B7C, p. 197

DELBERT E. GANTZ, Primary Examiner

J. W. HELLWEGE,, Assistant Examiner

U.S. Cl. X.R.

260—673.5; 208—136, 138